(12) United States Patent
Drego et al.

(10) Patent No.: US 9,942,046 B2
(45) Date of Patent: Apr. 10, 2018

(54) DIGITAL CURRENCY MINING CIRCUITRY WITH ADAPTABLE DIFFICULTY COMPARE CAPABILITIES

(71) Applicant: 21, Inc., San Francisco, CA (US)

(72) Inventors: Nigel Drego, San Francisco, CA (US); Veerbhan Kheterpal, Santa Clara, CA (US); Daniel Firu, San Jose, CA (US)

(73) Assignee: 21, Inc., San Francisco, CA (US)

( * ) Notice: Subject to any disclaimer, the term of this patent is extended or adjusted under 35 U.S.C. 154(b) by 68 days.

(21) Appl. No.: 14/705,905

(22) Filed: May 6, 2015

(65) Prior Publication Data

US 2016/0330031 A1 Nov. 10, 2016

(51) Int. Cl.
*H04L 1/00* (2006.01)
*H04L 9/32* (2006.01)

(52) U.S. Cl.
CPC ........ *H04L 9/3239* (2013.01); *H04L 2209/56* (2013.01)

(58) Field of Classification Search
CPC .... G06F 21/79; G06F 21/86; G06F 2209/463; G06F 2221/2129; G06F 9/465; G06F 9/541; G06F 12/0866; G06F 1/1626; G06F 2212/2022; G06K 19/06037; G06K 1/121; G06K 7/14; G06K 7/1417; G06K 19/073; H04L 2209/56; H04L 9/3239
See application file for complete search history.

(56) References Cited

U.S. PATENT DOCUMENTS 6,819,671 B1 * 11/2004 Chen ..................... H04L 45/745
370/389
6,829,355 B2 * 12/2004 Lilly ..................... H04L 9/0643
380/255

(Continued)

OTHER PUBLICATIONS

Tucket et al., "Interactive Demonstration: This Is How You Mine Some Bitcoin," Bloomberg Businessweek, Jan. 13, 2014 [Retrieved on Apr. 14, 2014]. Retrieved from the Internet <URL: http://http://www.businessweek.com/printer/articles/1 85845-interactive-demonstration-this-is-how-you-mine-some-bitcoin>.

(Continued)

*Primary Examiner* — Sayed Beheshti Shirazi
(74) *Attorney, Agent, or Firm* — Treyz Law Group, P.C.; Jason Tsai

(57) ABSTRACT

Cryptographic hashing circuitry such as mining circuitry used to mine digital currency may be formed on an integrated circuit. The hashing circuitry may include sequential rounds of register and logic circuitry that perform operations of a cryptographic protocol. A final hash output from the hashing circuitry may be checked using a difficulty comparison circuit to determine whether the hash output satisfies predetermined difficulty criteria. The difficulty comparison circuit may be configured as a hardwired comparison circuit having logic gates for checking only a subset of bits in the hash output. The comparison circuit may be adapted to change the number of bits that is checked based on a target number of bits for comparison set by the Bitcoin protocol. Candidate solutions found using the hardwired comparison circuit may then be fed to a host controller that checks the (Continued)

entire hash output to determine whether the candidate solution is valid.

9 Claims, 16 Drawing Sheets

(56) References Cited

U.S. PATENT DOCUMENTS

| | | | | |
|---|---|---|---|---|
| 7,142,669 B2* | 11/2006 | Dworkin | ............... | H04L 9/0643 380/28 |
| 7,249,255 B2* | 7/2007 | Anand | ................. | H04L 9/0643 380/28 |
| 7,584,441 B2* | 9/2009 | Gidon | .................. | G06F 17/505 716/113 |
| 7,757,187 B2* | 7/2010 | Kheterpal | ............ | G06F 17/505 716/104 |
| 7,783,691 B2* | 8/2010 | Liardet | ................. | G06F 9/3001 708/200 |
| 8,020,127 B1* | 9/2011 | Chan | ................... | G06F 17/5045 716/104 |
| 8,135,960 B2* | 3/2012 | Koehler | .................. | G06F 21/72 713/189 |
| 8,174,329 B2* | 5/2012 | Goodnow | ............ | H03K 3/0315 331/1 A |
| 8,380,683 B2 | 2/2013 | Shirai et al. | | |
| 8,787,563 B2 | 7/2014 | Shirai et al. | | |
| 8,843,457 B2 | 9/2014 | Shirai et al. | | |
| 8,850,199 B2 | 9/2014 | Zaverucha et al. | | |
| 2002/0191791 A1* | 12/2002 | Anand | .................... | G06F 21/72 380/255 |
| 2006/0136531 A1* | 6/2006 | Ng | ............................ | G06F 7/74 708/100 |
| 2008/0104552 A1* | 5/2008 | Yamada | .............. | G06F 17/5022 716/109 |
| 2010/0086127 A1* | 4/2010 | Grinchuk | ............. | H04L 9/0643 380/29 |
| 2010/0318947 A1* | 12/2010 | Motiani | .............. | G06F 17/5045 716/104 |
| 2011/0050281 A1* | 3/2011 | Moe | .................... | G06F 17/5045 326/38 |
| 2012/0257742 A1* | 10/2012 | Ebeid | .................... | H04L 9/0643 380/28 |
| 2013/0065669 A1* | 3/2013 | Michaelson | ........ | G07F 17/3225 463/25 |
| 2013/0065670 A1* | 3/2013 | Michaelson | ........ | G07F 17/3244 463/25 |
| 2013/0290713 A1 | 10/2013 | Zaverucha et al. | | |
| 2014/0093069 A1* | 4/2014 | Wolrich | ................... | G09C 1/00 380/28 |
| 2014/0298038 A1 | 10/2014 | Gauravaram | | |
| 2016/0086175 A1* | 3/2016 | Finlow-Bates | ....... | H04L 9/3271 705/77 |
| 2016/0125040 A1† | 5/2016 | Kheterpal et al. | | |
| 2016/0164672 A1* | 6/2016 | Karighattam | ......... | H04L 9/0643 380/28 |
| 2016/0283939 A1* | 9/2016 | Finlow-Bates | ...... | G06Q 20/065 |
| 2016/0358135 A1* | 12/2016 | Liao | ........................ | G06Q 20/10 |

OTHER PUBLICATIONS

Berke et al. "Bitcoin Demystified: A Hacker's Perspective," "HuffPost Code, Nov. 25, 2013 [Retrieved on Apr. 14, 2014]. Retrieved from the Internet <URL: http://www.huffingtonpost.com/ 201 3/11 /25/coin-basics-explained-explained_n_4340141. html?view=print&comm_ref=false>.

"Mining," Bitcoin Wiki, Apr. 1, 2014 [Retrieved on Apr. 14, 2014]. Retrieved from the Internet <URL:https://en.bitcoin.it/ wiki/Mining>.

Nakamoto, "Bitcoin: A Peer-to-Peer Electronic Cash System," www.bitcoio.org [Retrieved on Apr. 14, 2014]. .letrieved from the Internet <URL:https:Hbitcoin.org/bitcoin.pdf>.

"Block," Bitcoin Wiki, Mar. 2, 2014 [Retrieved on Apr. 14, 2014]. Rtrievedfrom the Internet <URL:https://en.bitcoin.itl wiki/Block>.

Pauker et al., U.S. Appl. No. 14/252,613, filed Apr. 14, 2014.

* cited by examiner
† cited by third party

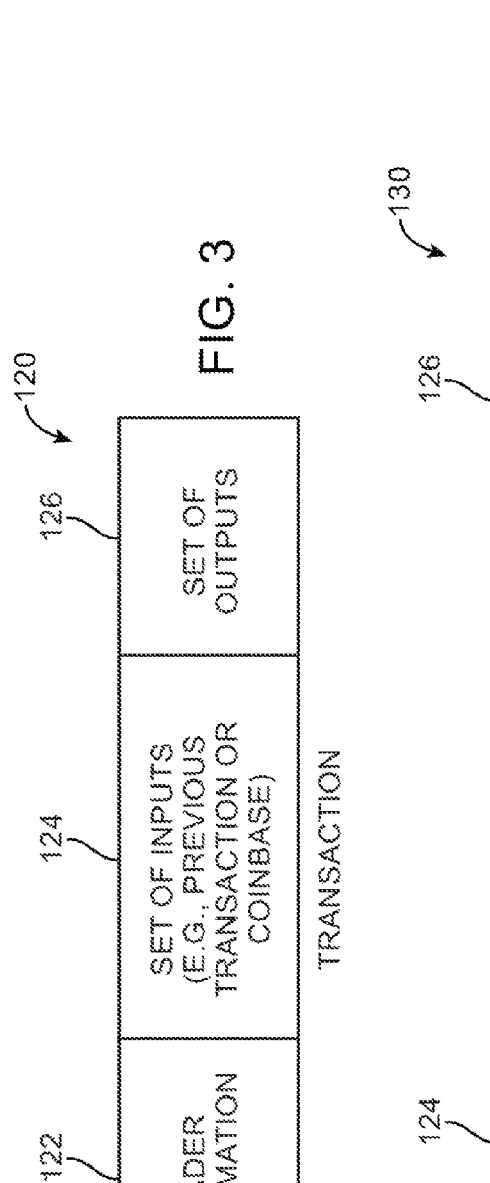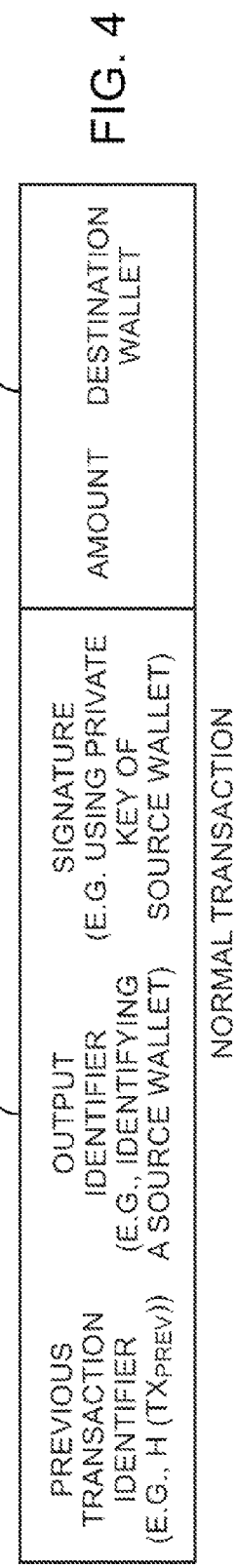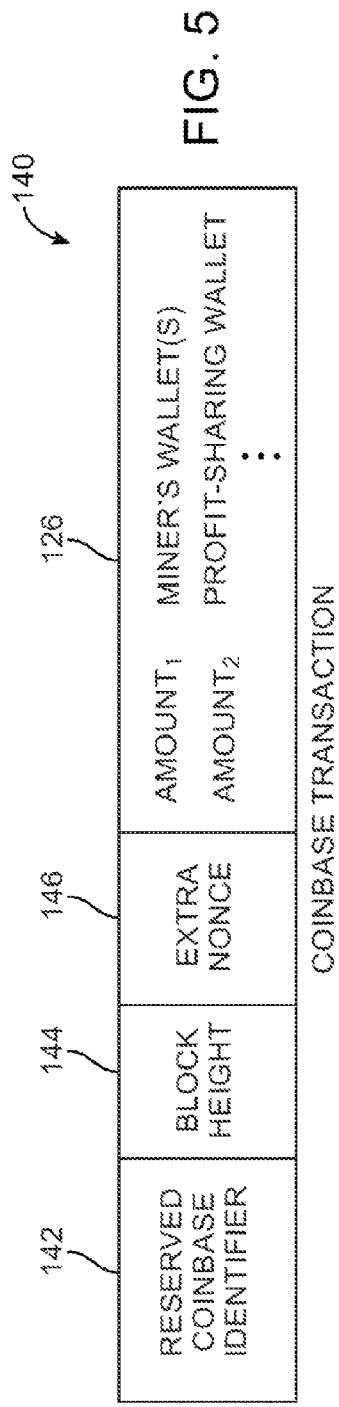
FIG. 3
FIG. 4
FIG. 5

| GROUP | BITS CHECKED |
|---|---|
| j = 0 | 0...31 |
| j = 1 | 32...35 |
| j = 2 | 36...39 |
| j = 3 | 40...43 |
| j = 4 | 44...47 |
| j = 5 | 48...51 |
| j = 6 | 52...55 |
| j = 7 | 56...59 |
| j = 8 | 60...63 |

DIGITAL CURRENCY MINING CIRCUITRY WITH ADAPTABLE DIFFICULTY COMPARE CAPABILITIES

BACKGROUND

This relates to circuitry for performing cryptographic operations, and more particularly, to circuitry for performing cryptographic hashing operations for mining digital currencies.

Digital currencies serve as a digital medium of exchange in which the digital currencies may be transferred in exchange for goods and services. Crypto-currencies are examples of digital currencies in which cryptography governs the creation and exchange of value. An example of a crypto-currency is the bitcoin cryptocurrency that is governed by the Bitcoin protocol. This is in contrast to traditional mediums of exchange that are governed, for example, by a central authority.

The Bitcoin protocol defines a system in which the creation and distribution of the bitcoin cryptocurrency is governed by consensus among a peer-to-peer network. The network maintains a public ledger in which new transactions are verified and recorded by members of the network via cryptography. The operations of verifying and recording transactions of cryptocurrencies such as transactions in the bitcoin cryptocurrency are sometimes referred to as mining, because completion of each mining operation typically rewards the miner with newly created cryptocurrency (e.g., bitcoins). Verified transactions and newly created bitcoins are recorded in the public ledger. The public ledger serves as an official history of transactions. The amount of cryptocurrency owned by any entity may be determined from the public ledger.

Bitcoin mining operations involve identifying a solution to a cryptographic puzzle in which transactions that are to be verified form part of the puzzle parameters. Bitcoin mining operations are typically performed via brute-force techniques (e.g., an exhaustive search for a puzzle solution performed across all possible solutions). Searching for solutions to the cryptographic puzzle involve performing cryptographic hashing functions and other cryptographic operations that are often computationally taxing. The difficulty of the cryptographic puzzle has led to the use of dedicated circuitry designed specifically for Bitcoin mining. Such dedicated circuitry can be expensive to design, purchase, and operate.

It may therefore be desirable to provide improved systems and methods for performing cryptographic operations and for verifying the solutions generated from the cryptographic operations.

SUMMARY OF THE INVENTION

Cryptographic hashing circuitry such as dedicated mining circuitry that may be used to mine digital currency by completing a function according to a protocol that governs the digital currency may be formed on an integrated circuit in an electronic device.

The hashing circuitry may include sequential rounds of register and logic circuitry that perform rounds of operations of a cryptographic protocol such as the Secure Hash Algorithm 256 (SHA-256) cryptographic algorithm based on an initial hash value and multiple message words to generate a corresponding hash output.

In accordance with an embodiment, bit comparison circuitry may be used to check a subset of bits in the hash output to identify a candidate solution. In response to identifying the candidate solution, a host controller may then be used to verify the candidate solution by determining whether the hash output satisfies predetermined difficulty criteria. The host controller may be shared among a plurality of cryptographic hashing circuitries that generate hash outputs for different search spaces in parallel. Operated in this way, the bit comparison circuitry may identify candidate solutions with partial certainty, whereas the host controller may verify the validity of the candidate solutions with full certainty.

In accordance with another embodiment, the bit comparison circuitry may include multiple logic gates each of which asserts an output signal when the subset of bits in the hash output matches with a predetermined value and deasserts the output signal when the subset of bits in the hash output differs from the predetermined value. At least one of the logic gates has an inverting input for implementing the desired hardwired comparison scheme.

The bit comparison circuitry may also include control circuitry that receives the output signals from the logic gates. In particular, the control circuitry may also receive an enable bit for each of the logic gates. If the enable bit is deasserted, the control circuitry may ignore the output signal from the corresponding logic gate. The control circuitry may issue a found signal only if the output signal from each of the logic gates with an associated high enable bit is asserted.

In accordance with yet another embodiment, the mining circuitry may receive a target number of bits to check in the hash output (e.g., a target number that is set by the Bitcoin protocol). One or more portions of the bit comparison circuitry may be selectively enabled to perform checking on one or more groups of bits in the hash output depending on the received target number. The bit comparison circuitry may be configured to perform comparison on a first number of group of bits in the hash output in response to determining that the received target number is less than a predetermined threshold level. The bit comparison circuitry may be configured to perform comparison on a second number of groups of bits in the hash output in response to determining that the received target number is greater than the predetermined threshold, where the second number of groups is greater than the first number of groups.

Further features of the invention, its nature and various advantages will be more apparent from the accompanying drawings and the following detailed description of the preferred embodiments.

BRIEF DESCRIPTION OF THE DRAWINGS

FIG. 3 is an illustrative transaction of digital currency that may be verified with mining circuitry in accordance with an embodiment.

FIG. 4 is an illustrative transaction of digital currency between source and destination wallets that may be verified using cryptographic hashing circuitry running on mining circuitry in accordance with an embodiment.

FIG. 5 is an illustrative coinbase transaction in which a portion of a reward amount is assigned to one or more different wallets in accordance with an embodiment.

DETAILED DESCRIPTION

The present invention relates to circuitry for performing cryptographic hashing operations for mining digital currencies such as cryptocurrencies, and more particularly, to circuitry for performing bit checking on hash outputs produced from the cryptographic hashing operations. Mining circuitry and mining operations described herein may be used for any digital medium of exchange such as digital currencies, credits, rewards, or points.

While the example of using circuitry to perform cryptographic operations for mining cryptocurrencies is sometimes described herein as an example, in general, the systems and methods described herein may be applied to any desired system for performing cryptographic operations such as cryptographic hashing operations (e.g., for encrypting or decrypting sensitive data, for protecting communications prior to data transmission of an unsecure medium, for obscuring or scrambling sensitive data, etc.).

Figure 1:
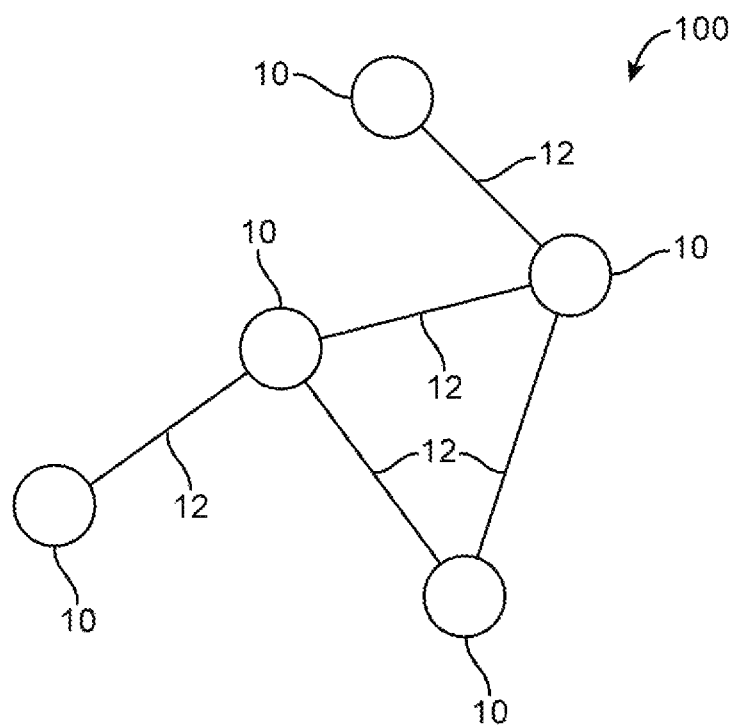
FIG. 1 is an illustrative diagram of a network of nodes that may mine digital currency in accordance with an embodiment.

In the example where cryptographic operations are performed for maintaining or mining a digital cryptocurrency, a network of peers (nodes) may be provided that maintain and/or mine the digital crypto-currency according to a crypto-currency protocol such as the Bitcoin protocol. FIG. 1 is an illustrative diagram of a peer-to-peer network 100 that may operate according to the Bitcoin protocol. Network 100 includes nodes 10 that are coupled to other nodes via paths 12. Nodes 10 may be electronic devices such as desktop computers, laptop computers, cellular telephones, servers, or other electronic devices that implement the Bitcoin protocol. Each node 10 may communicate with other nodes of network 100 over paths 12. Paths 12 may, for example, include network paths such as network cables and packet forwarding devices (e.g., switches, routers, etc.) that couple nodes 10 to other nodes. This example is merely illustrative. Nodes 10 of network 100 may be coupled via any desired underlying communications technology such as wired or wireless network technologies and network 100 may include any desired number of nodes (e.g., tens, hundreds, thousands, millions, or more).

Nodes 10 may communicate over paths 12 according to the Bitcoin protocol in maintaining the cryptocurrency. For example, nodes 10 may communicate to maintain a global ledger of all official transactions. Each node 10 may store a copy of the global ledger (e.g., a complete copy or only a partial copy). Transactions added to the global ledger by each node 10 may be verified by other nodes 10 to help ensure validity of the ledger.

Figure 2:
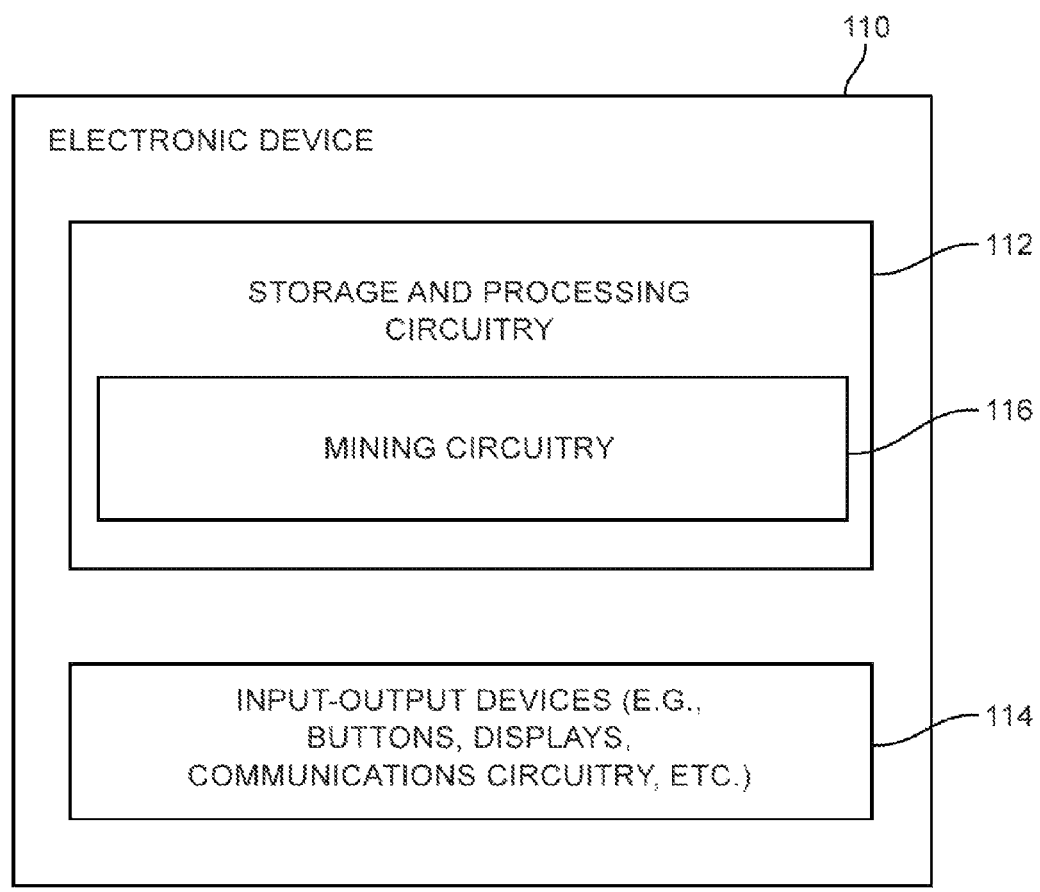
FIG. 2 is an illustrative diagram of an electronic device that may include digital currency mining circuitry in accordance with an embodiment.

FIG. 2 is an illustrative diagram of an electronic device 110 that may serve as a node in a peer-to-peer network (e.g., as a node 10 of FIG. 1). As shown in FIG. 2, device 10 may include storage and processing circuitry 112. Storage and processing circuitry 112 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 112 may be used to control the operation of device 10. This processing circuitry may be based on one or more general purpose processing circuits such as microprocessors, microcontrollers, and digital signal processors, or dedicated processing circuits such as application specific integrated circuits, etc.

Device 10 may be provided with input-output devices 114 such as buttons, speakers, microphones, displays, and other input-output devices that accommodate user interaction with device 110. Input-output devices 114 may include communications circuitry for communicating with other devices (e.g., other nodes of a cryptocurrency network). Mining circuitry 116 may perform mining operations such as verifying cryptocurrency transactions (e.g., while sharing any rewards or the mining operations between multiple entities such as a user of the device). Mining circuitry 116 may record the rewards in the global ledger. Mining circuitry 116 may, for example, be an integrated circuit chip. Electronic device 110 may include one or more of these chips that may be operated together or independently.

Electronic device 110 may be a desktop computer, a server in a rack-based system, a portable electronic device such as a tablet computer, laptop computer, or a cellular telephone. These examples are merely illustrative. Mining circuitry 116 may be provided to any desired electronic device that can communicate with other nodes of a cryptocurrency network. For example, a flash drive that connects with a computer may be provided with mining circuitry 116. In this scenario, the mining circuitry 116 may operate to perform mining operations by utilizing computer resources when the flash drive is connected to a computer (e.g., by utilizing power from the computer and a network connection between the computer and nodes of a cryptocurrency network).

FIG. 3 is a diagram of an illustrative cryptocurrency transaction 120 that may be verified using mining circuitry such as circuitry 116 of FIG. 2. As shown in FIG. 3, transaction 120 may include header information 122, a set of one or more inputs 124, and a set of one or more outputs 126.

Header information 122 may include one or more header fields including information that helps to identify the transaction. For example, the header fields may include a version number identifying the version of the Bitcoin protocol that is used. As another example, the header fields may include a current timestamp and/or other information on the transaction.

Digital currency may be stored in digital wallets that serve as sources or destinations of transactions. For example, a transaction may transfer funds from a source wallet to a destination wallet. Digital wallets may be formed using any desired data structure and may sometimes be referred to as digital accounts. Wallets may be identified using encryption schemes such as public-key cryptography in which a public-private key pair is assigned to each wallet. The public key of a wallet may serve to publicly identify the wallet (e.g., a public address to which funds may be directed), whereas the private key may be used by the owner of the wallet to sign transactions (e.g., thereby verifying the authenticity of the transactions).

Transaction 120 may identify an input 124 (e.g., a source of funds) and a set of outputs (e.g., destinations). The inputs and outputs may, for example, be digital wallets in which currency is stored. The inputs may refer to an output of a previous transaction as a source of funding or may identify that transaction 120 is an originating transaction that creates new currency (sometimes referred to as a coinbase transaction).

FIG. 4 is a diagram of an illustrative transaction 130 that transfers currency from a source wallet to a destination wallet. As shown in FIG. 4, input 124 may include a previous transaction identifier, an output identifier, and a signature. If desired, header information 122 of FIG. 3 such as version number or timestamp information may be included in the transaction of FIG. 5.

The previous transaction identifier may identify which transaction of the global ledger contains the source wallet. The previous transaction identifier may, if desired, identify the previous transaction TXPREV by a hash (e.g., H(TX-PREV)) or double-hash (e.g., H(H(TXPREV))) of the previous transaction. The output identifier may identify which output of the identified previous transaction serves as the source wallet of transaction 130. For example, the outputs 126 of the previous transaction may be enumerated and the index of the source wallet may serve as the output identifier.

Transaction 130 may be signed to help ensure authenticity of the transaction. For example, the private key of the source wallet may be used to encrypt transaction 130 or a portion of transaction 130 to generate the signature that is stored in transaction 130. The public key of the source wallet may be used by others (e.g., other network nodes) to decrypt the signature and confirm the authenticity of the transaction.

The set of outputs 126 identifies one or more destination wallets and a respective amount to transfer from the source wallet to each destination wallet. In the example of FIG. 4, the transaction includes one destination wallet and a corresponding amount to be transferred from the source wallet to the destination wallet.

FIG. 5 is an illustrative diagram of an originating transaction (i.e., coinbase transaction) that may generate new digital currency. As shown in FIG. 5, transaction 140 includes information that identifies the transaction as a coinbase transaction. The information may include a reserved coinbase identifier 142, a block height 144, and an extra-nonce value 146. If desired, header information 122 of FIG. 3 such as version number or timestamp information may be included in the transaction of FIG. 5.

Reserved coinbase identifier 142 may be a value that is reserved for coinbase transactions. Block height 144 may help identify where the coinbase transaction is located within the global ledger (e.g., which block of a block chain that represents the global ledger). Extra-nonce value 146 is an arbitrary value that may be modified during mining operations.

In contrast to normal transactions such as transaction 130 of FIG. 4, coinbase transaction 140 does not provide a source of funds for outputs 126. Instead, coinbase transaction 140 may create new currency. The amount of new currency created is determined by the cryptocurrency protocol. For example, nodes of the cryptocurrency network may communicate and establish an agreed-upon reward that is created for verifying transactions. The agreed-upon reward may be determined based on the size of the global ledger (e.g., how many recorded blocks are in the global ledger). As an example, the reward for verifying and recording transactions in the Bitcoin protocol may reward a number of bitcoins (units of currency) such as 25 bitcoins. This example is merely illustrative, as the number of bitcoins rewarded may be less than 25 (e.g., 12.5, 6.25, etc.) or may even be zero.

In some scenarios, transactions that are verified using mining circuitry may include fees. For example, transaction 130 of FIG. 4 may assign fewer bitcoins to destination wallets than contained in the source wallet. In this scenario, the remainder may serve as fees (e.g., an additional reward) for a miner. This additional reward may be assigned to the miner's wallet in coinbase transaction 140 or may also be partitioned by the mining circuitry between the miner's wallets and other wallets (e.g., profit-sharing wallets).

Figure 6:
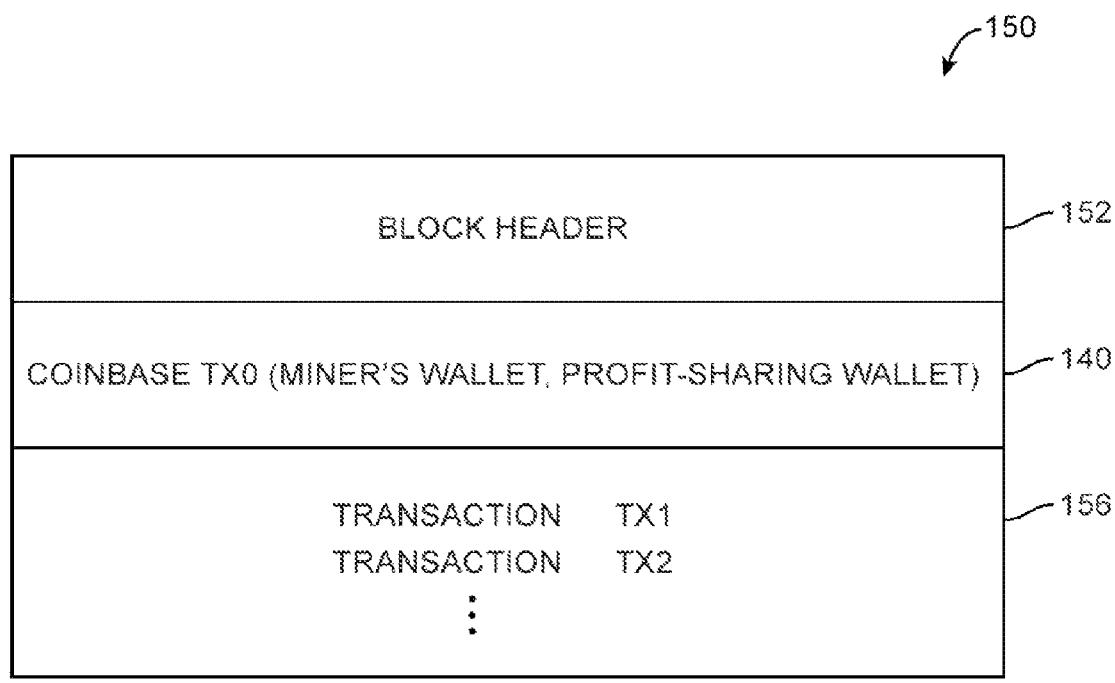
FIG. 6 is an illustrative block that may be generated by mining circuitry and recorded in a global ledger in accordance with an embodiment.

In performing mining operations to verify and record a set of transactions, mining circuitry may generate a block to be recorded in the global ledger as shown in FIG. 6. Block 150 of FIG. 6 may include block header 152, coinbase transaction TX0 (e.g., a coinbase transaction 140), and a set of transactions 156 to be recorded.

Figure 7:
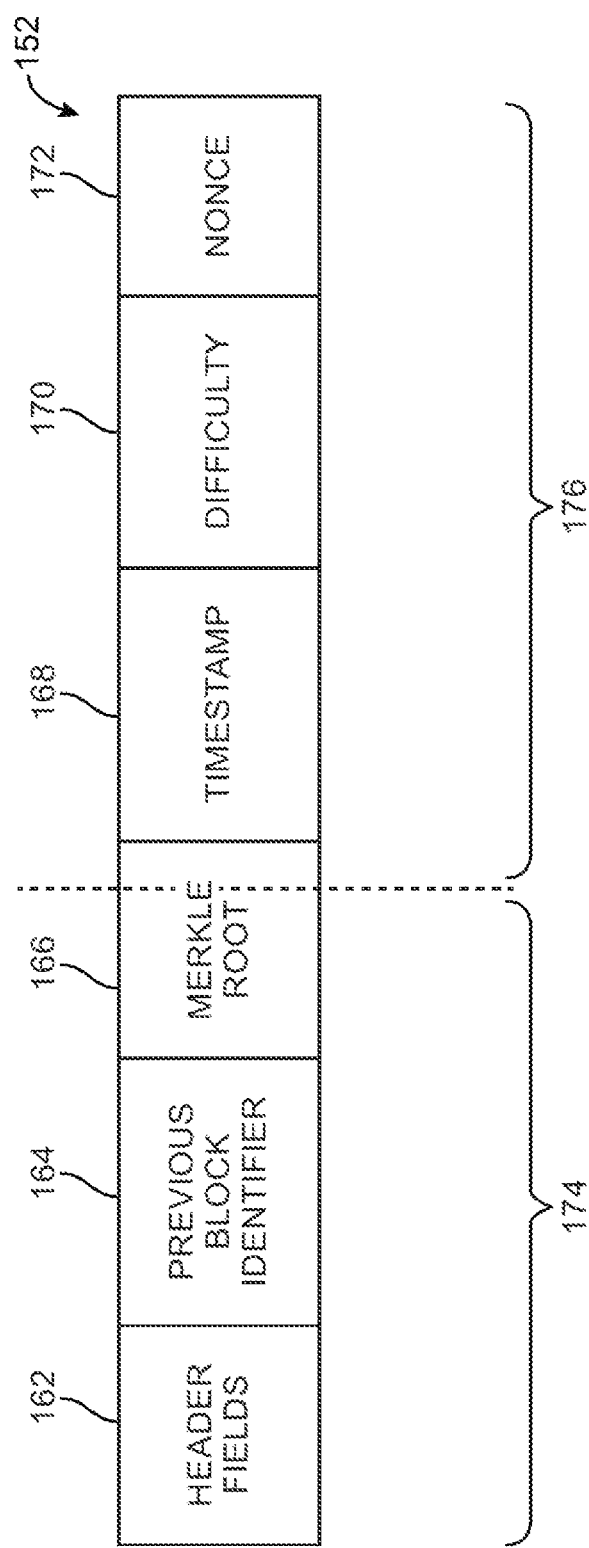
FIG. 7 is an illustrative block header that may be generated by mining circuitry in solving a cryptographic puzzle in accordance with an embodiment.

Block header 152 may include information that identifies block 150 and additional information generated by the mining circuitry to complete a function such as information satisfying a cryptographic puzzle. The additional information may be generated to solve the function (e.g., puzzle) for a given set of function inputs that are at least partially determined by block header 152 and for a desired output or range of outputs. FIG. 7 is a diagram of an illustrative block header 152. As shown in FIG. 7, block header 152 may include header fields 162, a previous block identifier 164, a Merkle root 166, a timestamp 168, a difficulty value 170, and a nonce value 172.

Header fields 162 may include any desired header fields such as a version number of the Bitcoin protocol. Previous block identifier 164 may identify a previous block in the global ledger (e.g., the global ledger may be a chain of blocks 152 in which each block references a previous block in the chain). For example, the previous block identifier may be a hash of the block header of the previous block.

Merkle root 166 may be generated from the transactions of block 150 including coinbase transaction 140 and the set of transactions 156. Merkle root 166 may provide a compact representation of the transactions in block 150. For example, Merkle root 166 may be a 256-bit (32 Byte) value, whereas the transactions of block 150 may be hundreds, thousands, or millions of bytes.

Difficulty value 170 is a parameter of the function (e.g., cryptographic puzzle) that is solved with block 150. For the Bitcoin protocol, the cryptographic puzzle involves generating block header 152 such that the hash of block header 152 is less than a predetermined value. The hash may be calculated using a protocol-determined hash function such as the Secure Hash Algorithm (SHA). The predetermined value may depend on difficulty value 170. For example, difficulty value 170 may specify how many leading zeros in a binary data representation are required in the hashed block header value.

Mining circuitry 116 may adjust one or more of the fields in block header 152 in order to provide block header 152 with a hash value that solves the cryptographic puzzle (e.g., a sufficiently small hash value). For example, the mining circuitry may adjust the nonce value or the timestamp value. As another example, the mining circuitry may adjust the extra-nonce value in the coinbase transaction of the block, which indirectly adjusts the Merkle root. Mining circuitry 116 may perform exhaustive search by iterating over all possible solutions to the cryptographic puzzle.

Hash functions used by the cryptographic puzzle may operate in sequential steps (sometimes referred to herein as stages) on block header 152. If desired, a first portion 174 of block header 152 may be processed in a first hashing stage, whereas a second portion 176 of block header 152 may be processed in a second, subsequent hashing stage. Each hashing stage may involve a number of so-called rounds of logical operations. Each round of logical operations may involve the same logical functions (e.g., operating on different inputs for each round). For example, the output of a given round of logical operations in the hashing function may serve as an input for a subsequent round of the logical operations. The logical operations may iteratively be performed in this way to produce an output of the hashing function. For example, when a Secure Hashing Algorithm (SHA) 256 function is used, second portion 176 of block header 152 may be operated on by 64 rounds of SHA-256 before producing a hash output (e.g., an initial input to logical circuitry implementing the SHA-256 hashing algorithm may be operated on by the logic circuitry and provided as an input to a subsequent round of logic circuitry identical to the previous round of logical circuitry, and so on until the desired number of rounds of logic functions have been performed). This example is merely illustrative. The number of rounds of hashing may depend on the hashing algorithm performed by mining circuitry 116.

Portion 174 may include header fields 162, previous block identifier 164, and a first portion of Merkle root 166, whereas portion 176 may include a second portion of Merkle root 166, timestamp 168, difficulty value 170, and nonce value 172. The SHA function may produce an output value for the first stage based on portion 174 of block header 152. The output value of the first stage may serve as an input to the second stage of the SHA function along with portion 176 of block header 152. The second stage of the SHA function may produce the hash value of block header 152. The SHA function may be implemented using dedicated hardware circuitry on mining circuitry 116.

Figure 8:
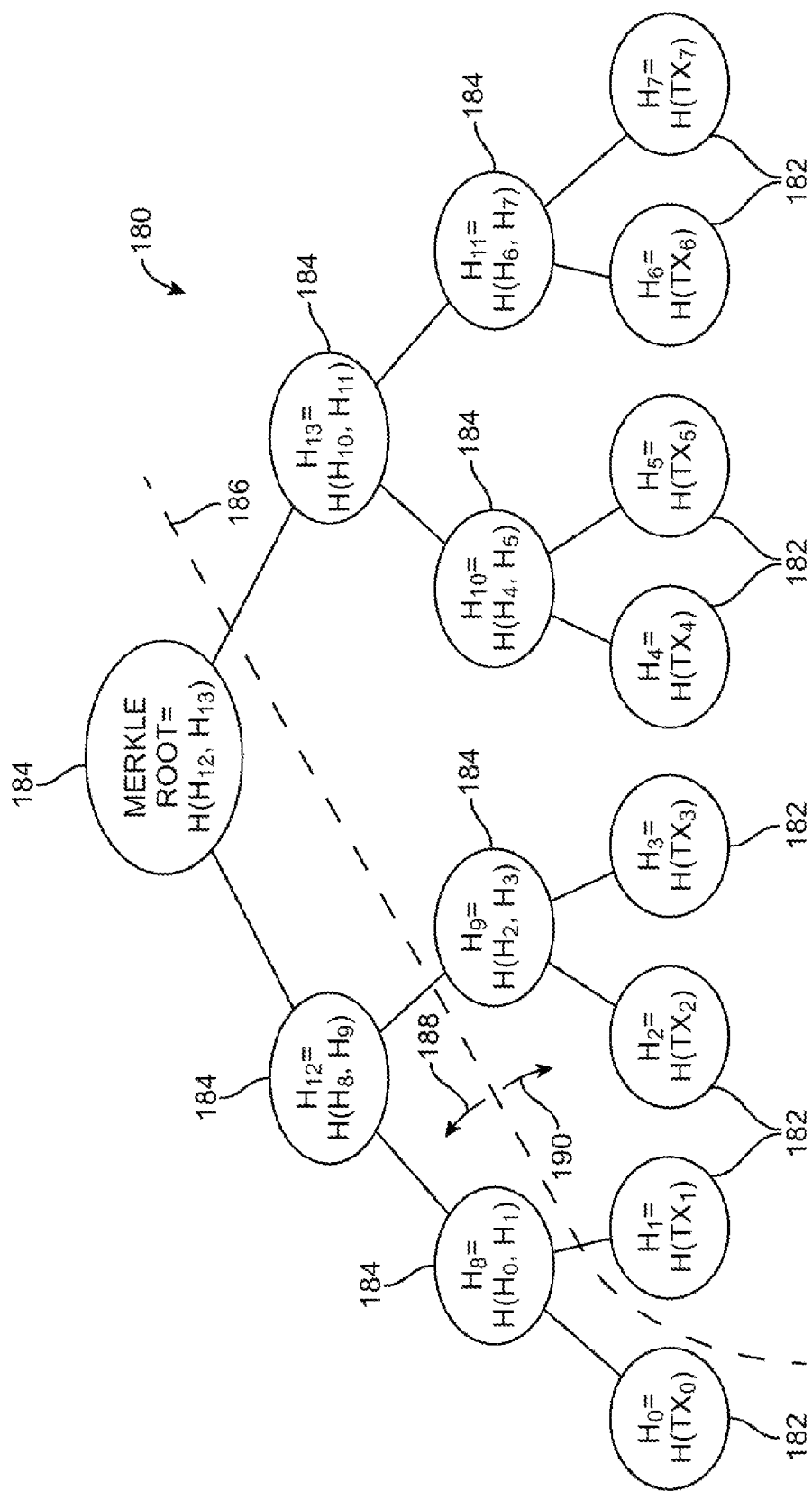
FIG. 8 is an illustrative Merkle tree that may be calculated by mining circuitry from a set of transactions in solving a cryptographic puzzle in accordance with an embodiment.

Merkle root 166 may be computed by generating a Merkle tree from the transactions of the corresponding block 150. FIG. 8 is a diagram of an illustrative Merkle tree 180 generated from a block including transactions TX0, TX1, TX2, TX3, TX4, TX5, TX6, and TX7. The example of FIG. 8 in which the block includes eight transactions is merely illustrative. A Merkle tree may be computed from any binary number of transactions (e.g., 2, 4, 6, 8, etc.). If a block does not contain a binary number of transactions, placeholder transactions may be added to complete the Merkle tree. Such placeholder transactions are used only in generating the Merkle tree and are not added to the block.

As shown in FIG. 8, Merkle tree 180 includes leaf nodes 182 that are each generated by computing the hash of a respective transaction (e.g., using the SHA function). For example, hash value H0 is computed from the (double) hash of transaction TX0 (e.g., a coinbase transaction), whereas hash values H1, H2, H3, H4, H5, H6, and H7 are computed from transactions TX1, TX2, TX3, TX4, TX5, TX6, and TX7, respectively.

Merkle tree 180 may be organized as a binary tree in which each non-leaf node 184 has two child nodes. The nodes of each successive level of the tree may be computed by hashing nodes of a lower (previous) level. The second level of the tree (e.g., the nodes storing hash values H8, H9, H10, and H11) may be generated by hashing the values stored in leaf nodes 182. For example, hash value H8 is generated by concatenating leaf values H0 and H1 and hashing the concatenated result. Similarly, the third level of the tree may be generated by hashing the values of the second level (e.g., hash value H12 may be calculated by hashing the concatenation of H8 and H9, whereas hash value H13 may be calculated by hashing the concatenation of H10 and H11). The number of levels in the tree may depend on the number of transactions in the block. In the example of FIG. 8, the root of Merkle tree 180 is at the fourth level and is calculated from hashing values H12 and H13.

The hashed value at each node of Merkle tree 180 has a fixed, predetermined size (e.g., 256 bits), and is dependent on the values at the children of that node. The Merkle root therefore serves as a compact representation of all of the transactions in the corresponding block, because any changes to a transaction percolate upwards to the Merkle root. For example, changes to coinbase transaction TX0 causes hash value H8 to change, which modifies hash value H12, which then modifies the Merkle root value. Similarly, changes to any of the transactions result in changes to the Merkle root value.

Mining circuitry 116 may generate some or all of Merkle tree 180 while searching for solutions to a cryptographic puzzle. For example, in iterating through extra-nonce values in a coinbase transaction TX0, the mining circuitry may need to re-compute the Merkle root for each new extra-nonce value. To help reduce computation time and improve performance, the mining circuitry may re-compute only a portion of Merkle tree 180 during each iteration. In particular, changes to coinbase transaction TX0 only affect hash values H0, H8, H12, and the Merkle root, whereas the remaining nodes of the Merkle tree are unchanged. Dotted line 186 represents the edge of the Merkle tree that separates hash values that need to be recomputed and hash values that remain unchanged when modifying coinbase transaction TX0. Nodes to the left of edge 186 need to be recomputed (portion 188 of tree 180), whereas nodes to the right of edge 186 do not need to be recomputed (portion 190 of tree 180). The mining circuitry can store the constant nodes at edge 186 and reuse the stored values to re-compute the Merkle root. In the example of FIG. 8, hash values H1, H9, and H13 may be stored, whereas the remaining hash values of tree portion 190 do not need to be stored. If desired, nodes to the left of edge 186 may be computed off-chip by circuitry external to mining circuitry 116 (e.g., to save processing time, power, and chip area on mining circuitry 116).

Figure 9:
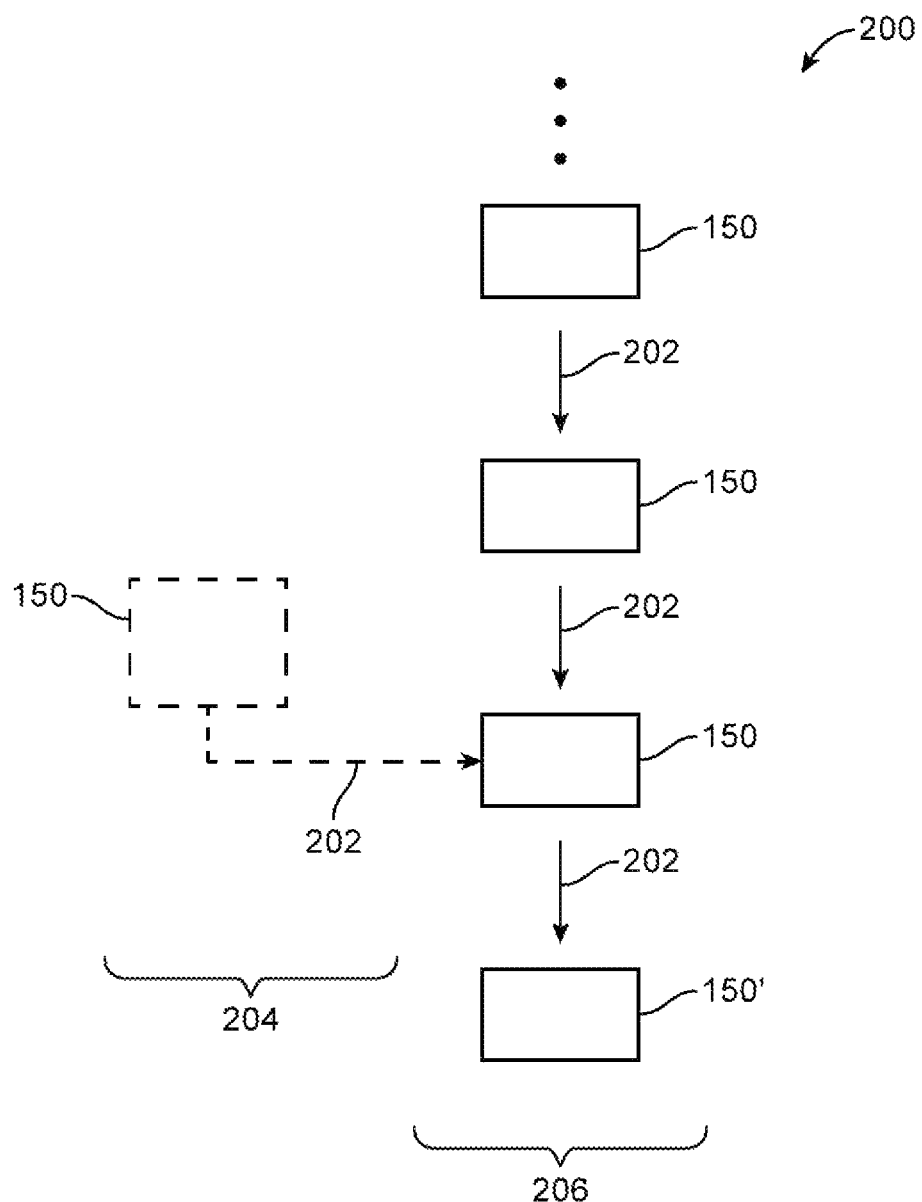
FIG. 9 is an illustrative block chain that may be maintained by a network of nodes as a global ledger of digital currency transactions in accordance with an embodiment.

FIG. 9 is an illustrative diagram of a global ledger that is formed from a block chain 200. As shown in FIG. 9, block chain 200 may include an originating block 150' that does not point to any previous block. For example, the previous block identifier 164 of block 150' does not identify any other blocks. Each successive block 150 identifies the previous block in the chain as shown by arrows 202 (e.g., the previous block identifier 164 of each block identifies the previous block in block chain 200).

During mining operations, a device collects a set of transactions that have not already been recorded in block chain 200. The mining circuitry may identify the last (most recently recorded) block in block chain 200. The mining circuitry may subsequently generate a new block 150 from the set of transactions such that the new block includes an identifier 164 that identifies the last block of block chain 200 and solves the cryptographic puzzle of the cryptocurrency protocol used by the block chain.

It is possible for block chain 200 to include multiple branches. For example, branch 204 may be generated when different puzzle solutions are discovered that each have the same previous block identifier. In this scenario, the branch that is longer and includes more blocks serves as the global register. In other words, branch 204 is ignored and the transactions in block 150 of branch 204 are not considered to be recorded, because branch 206 includes more blocks than branch 204 (i.e., four connected blocks in branch 206 compared to only three in branch 204).

Figure 10:
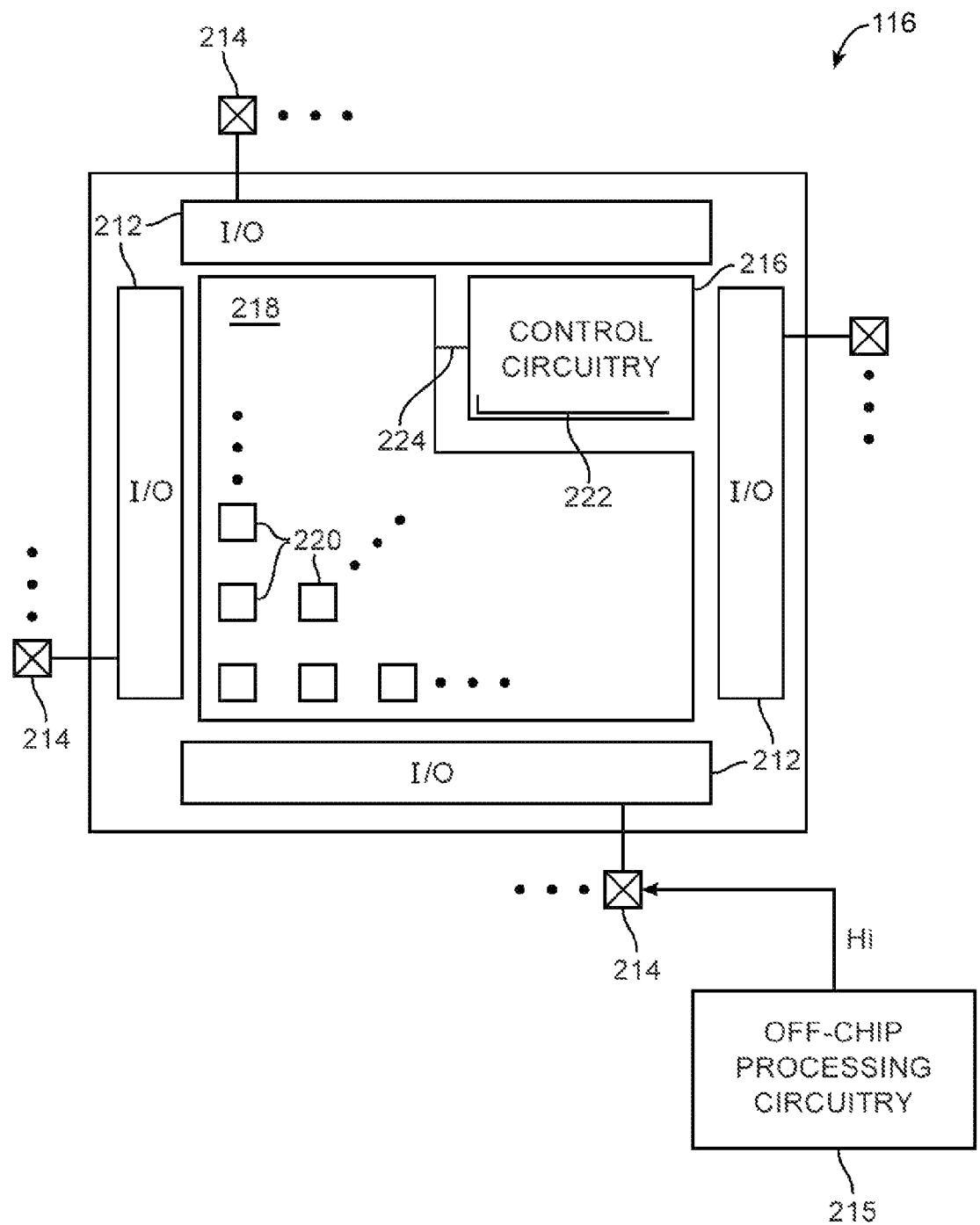
FIG. 10 is an illustrative diagram of mining circuitry that includes control circuitry and multiple processing cores for performing cryptographic hashing functions in parallel on different portions of a search space in accordance with an embodiment.

Mining circuitry such as circuitry 116 of FIG. 2 may be implemented as a dedicated integrated circuit (e.g., an application-specific integrated circuit) as shown in the diagram of FIG. 10. As shown in FIG. 10, integrated circuit 116 may have input-output (I/O) circuitry 212 for driving signals off of device 116 and for receiving signals from other devices via input-output pins 214. For example, I/O circuitry 212 and pins 214 may convey signals between mining circuitry 116 and other circuitry on electronic device 110 of FIG. 2. As shown in FIG. 10, mining circuitry 116 may receive data from off-chip processing circuitry such as processing circuitry 215. Off-chip circuitry 215 may be used to pre-compute portions of the hashing functions performed by circuitry 116. For example, off-chip circuitry 215 may compute hash values of portion 174 of block header 152 as shown in FIG. 7 and may provide the hash value (e.g., hash value $H_i$) to circuitry 116. Circuitry 116 may use hash value $H_i$ as an input when performing hashing functions on portion 176 of block header 152.

Mining circuitry 116 may include a core region 218 and control circuitry 216 that is coupled to the core region by paths 224 such as interconnect paths. Core region 218 may include multiple core circuits 220 that may be controlled by control circuitry 216 to identify solutions to a cryptographic puzzle. For example, each core circuit 220 may include dedicated logic that performs a cryptographic algorithm such as the SHA function on inputs provided by control circuitry 216 over paths 224. Core region 218 may include any desired number of core circuits that are operated in parallel by control circuitry 216 (e.g., tens, hundreds, or more core circuits).

The inputs provided by control circuitry 216 to a given core 220 may include a partially filled block header. For example, the partially filled block header may include header fields 162, previous block identifier 164, a current time, and difficulty value 170. The inputs may include the Merkle root of the transactions of the block to be solved, the transactions themselves, or sufficient information for computing the Merkle root (e.g., Merkle tree edge 186 of FIG. 8). The inputs may include initial hash values $H_i$ computed by off-chip processing circuitry 215. The remaining fields of the block header and block may be generated by core 220 in attempting to solve the cryptographic puzzle with inputs provided by the control circuitry.

Control circuitry 216 may partition the search space of possible solutions to the cryptographic puzzle and assign each core circuit 220 a different portion of the search space (e.g., so that multiple core circuits 220 operating in parallel can more efficiently search for solutions to the cryptographic puzzle). The search space may be partitioned based on the inputs provided by the control circuitry to the core circuits. The search space may be partitioned, for example, by assigning different ranges of nonce values 172 to different cores 220, by assigning different ranges of extra nonce values to different cores 220, etc.

If desired, each core circuit 220 in mining circuitry 116 may include dedicated logic that performs cryptographic hash functions such as Secure Hash Algorithm (SHA) functions. For example, cores 220 may perform SHA-2 hash functions (e.g., SHA-256 hash functions that are computed with 32-bit words as a message schedule input to each round of hashing and that outputs 256-bit hash outputs) on inputs provided by control circuitry 216 over paths 224.

Figure 11:
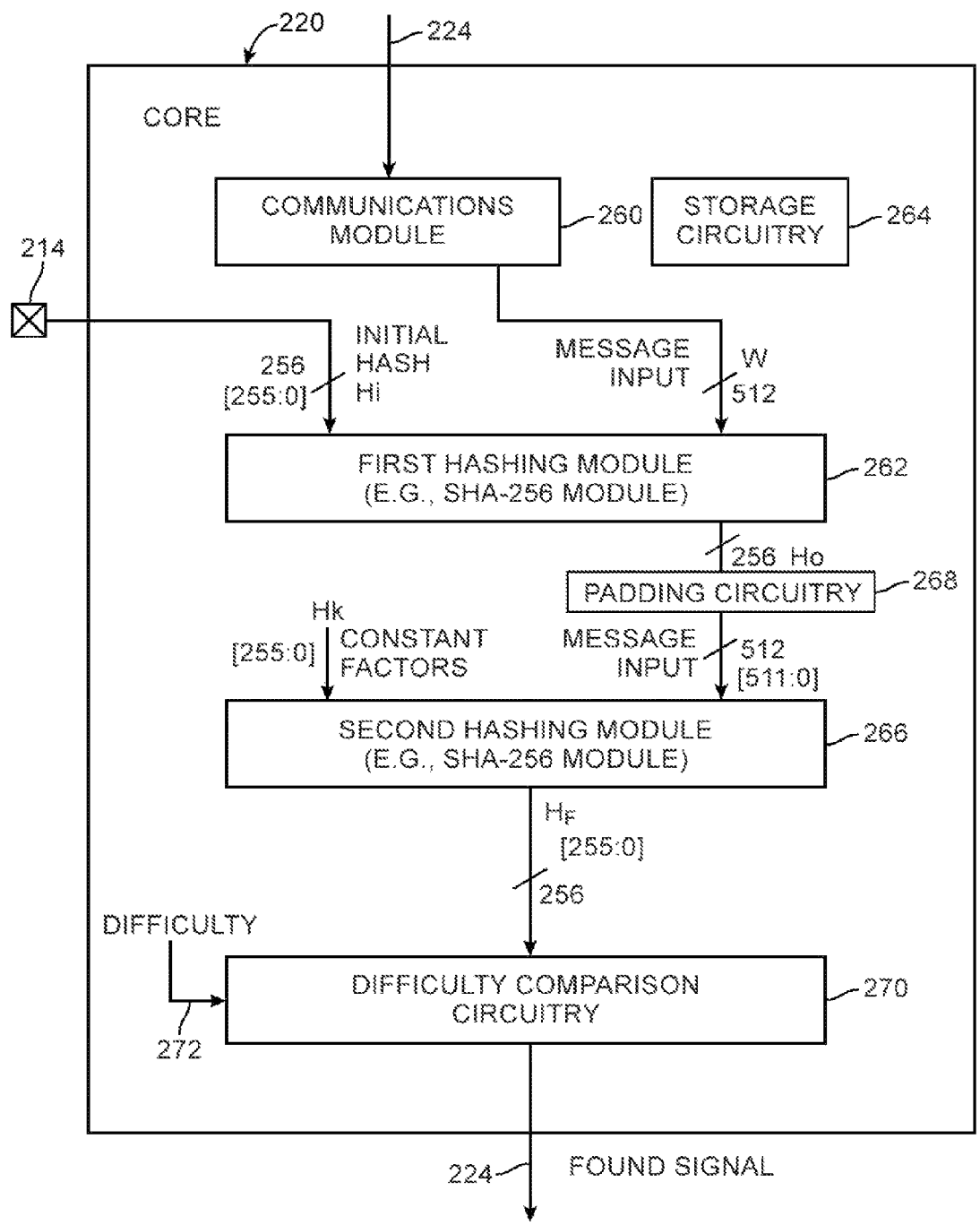
FIG. 11 is an illustrative diagram of a processing core in mining circuitry that may perform rounds of cryptographic hashing (e.g., SHA-256 hashing) in accordance with an embodiment.

FIG. 11 is an illustrative diagram of an exemplary core 220 in circuitry 116 of FIG. 10. In the example of FIG. 11, circuitry 220 is used for performing SHA-256 hashing on inputs received from control circuitry 216. However, this is merely illustrative and in general, core 220 may be used to perform any desired hashing algorithm on inputs received from control circuitry 216 (e.g., for use in a bitcoin protocol, another digital currency protocol, or for use in a cryptographic system unrelated to a digital currency), or core 220 may be formed separate from mining circuitry 116 (e.g., on a dedicated integrated circuit or integrated circuit separate from mining circuitry 116) and may generally perform cryptographic hashing functions (e.g., SHA-256 hashing) on any desired input received from any desired source.

As shown in FIG. 11, core 220 may include communications circuitry such as communications module 260 that receives a message input W from control circuitry 216 via path 224. The message input W received from control circuitry 216 may include portions of block header 152 for use as an input to a SHA-256 hashing algorithm, for example. Core 220 may receive an initial hash input $H_i$ from external circuitry 215 via input/output port 214. The initial hash input $H_i$ may be computed off-chip based on a portion of a bit coin block header. For example, initial hash input $H_i$ may be computed at circuitry 215 by hashing portion 174 of block header 152 (e.g., using single or double hashing with a SHA-256 hashing protocol). Core 220 may include storage circuitry 264 that includes volatile and/or non-volatile memory.

If desired, core 220 may include multiple sequential hashing modules such as first hashing module 262 and second hashing module 266. First and second hashing modules 262 and 266 may be used to perform a double SHA-256 hash based on initial hash $H_i$ and the message input received on line 224. For example, first hashing module 262 (sometimes referred to herein as first SHA-256 module 262) may perform SHA-256 hashing on initial hash $H_i$ and message input W to produce a first hash output $H_O$. The first hash output $H_O$ may be provided as a message input to second hashing module 266 (sometimes referred to herein as second SHA-256 module 266). Second hashing module 266 may receive constant factors $H_k$ as an initial hash input (e.g., constant factors determined by the SHA-256 hashing algorithm such as one or more prime numbers sometimes referred to as "initial primes"). Second hashing module 266 may perform SHA-256 hashing on the constant factors $H_k$ using a message input based on first hash output $H_O$ to produce a second hash output $H_F$ (sometimes referred to herein as a final hash output).

In the example of FIG. 11, initial hash $H_i$ includes 256 bits whereas message input W includes 512 bits. First hash output $H_O$ may include 256 bits (e.g., as determined by the SHA-256 algorithm implemented by first hashing module 262). Core 220 may include padding circuitry 268 for padding first hash output $H_O$ with a desired number of zeros so that padded first hash output $H_O$ includes 512 bits (e.g., so that first hash output $H_O$ can be used as the 512-bit message input to second SHA-256 module 266). The constant factors $H_k$ input to second hashing module 266 may include 256 bits. Second hash output $H_F$ may include 256 bits (e.g., as determined by the SHA-256 algorithm implemented by second hashing module 266).

Core 220 may include difficulty comparison circuitry 270. Second hash output $H_F$ may be provided to difficulty comparison circuitry 270. Difficulty comparison circuitry 270 may compare second hash output $H_F$ to a predetermined difficulty value received at input 272. Difficulty value 272 may, for example, be received from control circuitry 216 or other desired external circuitry. Difficulty value 272 may, for example, be specified by the digital currency protocol implemented by mining circuitry 116 or by any other source (e.g., the difficulty value may be determined by the network of nodes operating on the bitcoin protocol and may be adjusted over time so that a predictable number of solutions to the cryptographic puzzles are computed by the entire network in a given time period). If second hash output $H_F$ satisfies the predetermined difficulty value (e.g., if a number of least significant zero bits as specified by the bitcoin protocol is sufficient or if value $H_F$ is less than the predetermined difficulty value), a found signal may be issued on line 224 indicating that a solution has been found for the given initial hash $H_i$ and message input W (e.g., for the bitcoin block header associated with the initial hash and message). If no solution is found, the search space may be changed (e.g., using a different timestamp field 168, difficulty field 170, nonce field 172, extra nonce field, etc.) and computation may be repeated until a solution is found, until the search space is changed, or until a new block 150 in block chain 200 (FIG. 9) is received.

Each hashing module 262 and 266 may perform multiple rounds of SHA-256 hashing (e.g., as specified by the SHA-256 hashing protocol). Each round of hashing may involve performing the same logical functions on an input to that round to produce an output for that round. Each round of hashing may receive a portion of the message input W (e.g., a 32-bit word of the message input or a modified 32-bit word derived from the message input W). The output of a given round may serve as an input for the next round (along with another word from the message input).

In a scenario sometimes described herein as an example (e.g., when operating under the Bitcoin or SHA-256 protocol), first hashing module 262 may perform 64 rounds of hashing based on initial hash $H_i$ and input message W to produce first hash output $H_O$. Similarly, second hashing module 266 may perform 64 rounds of hashing based on the constant factors and first hash output $H_O$ to produce second hash output $H_F$. In typical scenarios, each round of SHA-256 hashing performed by first hashing module 262 (or second hashing module 266) is performed by dedicated logic on core 220. The output of a first round of SHA-256 logic in first hashing module 262 may serve as an input to the second round of SHA-256 logic in first hashing module 262 (along with a word generated by message schedule logic based on input message W), the output of which may serve as an input to a third round of SHA-256 logic in first hashing module 262 (along with an additional word generated by the message schedule logic based on input message W), etc. Each round of SHA-256 performed by first hashing module 262 and second hashing module 266 may be performed on a hash input and a corresponding message input. The hash input and message input may be combined as determined by the SHA-256 protocol to produce a hash output used as a hash input of the subsequent round of SHA-256 hashing. The hash output of the final (e.g., $64^{th}$) round may be output as the hash output value $H_O$ or $H_F$. This example is merely illustrative and in general, core 220 may include any desired number of hashing modules that perform any desired number of rounds of hashing using any desired hashing protocol.

Figure 12:
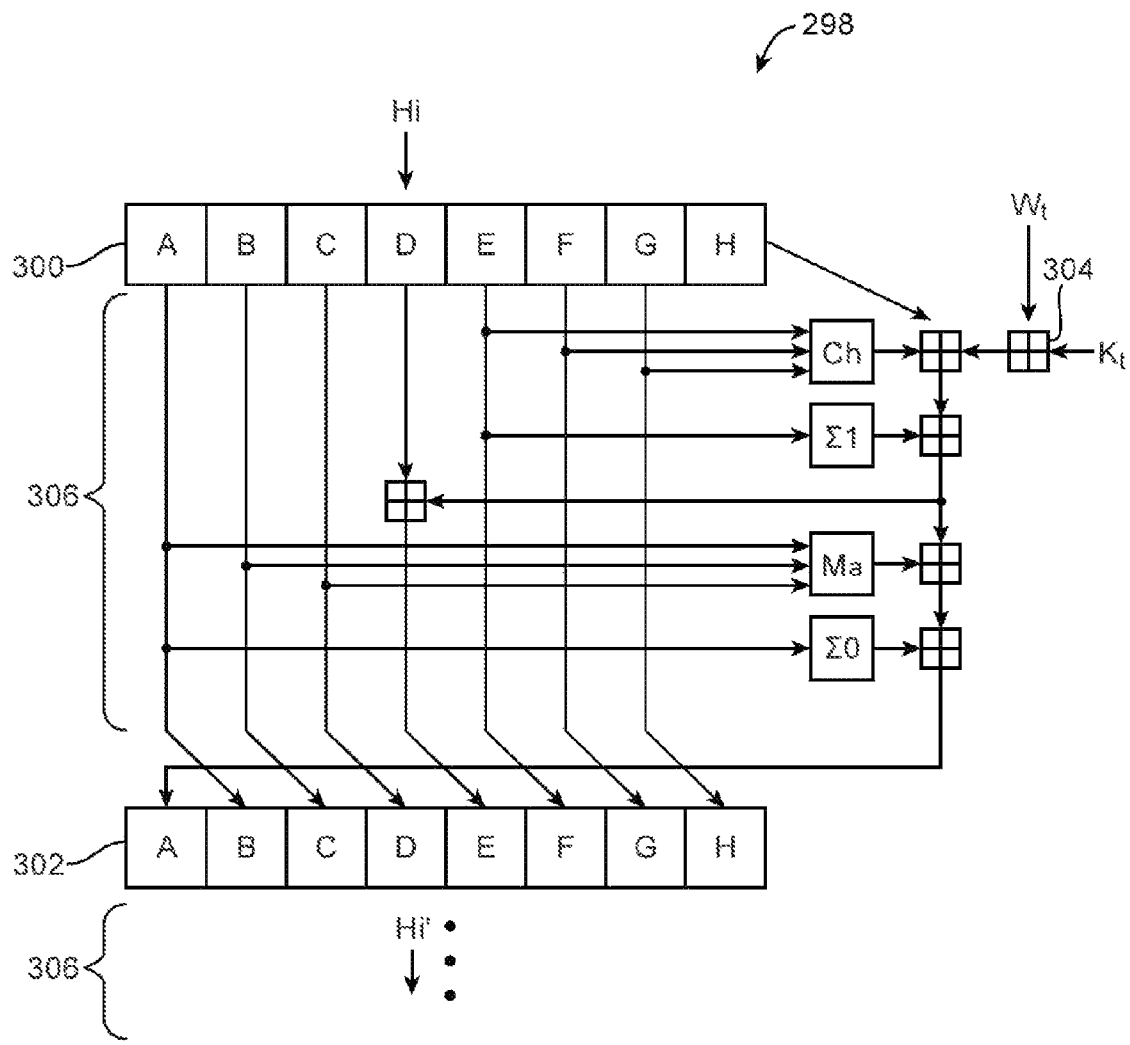
FIG. 12 is an illustrative diagram of a round of hashing logic that may perform a round of a hash schedule (e.g., a round of SHA-256 hashing) on an input hash value and a word received from message scheduling circuitry to generate a corresponding hash output in accordance with an embodiment.

The logical operations implemented by the SHA-256 hashing protocol may be performed by dedicated logic hardware (e.g., hardcoded circuitry) on first and second hashing modules 262 and 266, for example. Performing logical operations using hardware may be significantly faster than performing the same logical operations using software. FIG. 12 is an illustrative diagram of a single round of the SHA-256 hashing function logic that may be formed using dedicated logic on core 220. The circuitry of FIG. 12 may be implemented on the first and/or second hashing modules of FIG. 11 and may be repeated on the hashing module for each number of rounds implemented by the hashing module (e.g., the circuitry of FIG. 12 may be repeated 64 times in each hashing module). The circuitry of FIG. 12 may sometimes be referred to herein as a hash schedule, hash scheduling circuitry, hash schedule logic, or hash scheduling logic.

As shown in FIG. 12, SHA-256 hashing circuitry 298 may include storage circuitry such as storage circuitry 300 and 302 (e.g., register circuitry 300 and 302). Register circuitry 300 may serve as an input register to the corresponding round of SHA-256 hashing logic 306. Data stored on register circuitry 300 may be passed to SHA-256 hashing logic 306 and operated on according to the SHA-256 hashing protocol (e.g., as shown in the logical diagram of FIG. 12). The output of SHA-256 logic 306 may be passed to output register 302. In typical arrangements, register circuitry 300 and 302 each include eight corresponding registers A-H (e.g., a first register A, a second register B, a third register C, etc.) that each stores a corresponding 32-bit hash value (e.g., register A may store the most significant 32 bits of initial hash $H_i$ whereas register H stores the least significant 32 bits of initial hash $H_i$ for the first round of hashing). In other words, a 256 bit hash input $H_i$ may be partitioned into eight 32-bit hash values A-H each stored on a corresponding register of input register circuitry 300. Each 32-bit hash value may be passed to logic 306 along with portions (words) $W_t$ of message input W. The output of logic 306 may be stored on register circuitry 302 (e.g., the output of logic 306 may be partitioned into 32-bit hash values A-H each stored on a corresponding register of output register circuitry 302).

As an example, hash schedule logic 298 of FIG. 12 may be a first round of SHA-256 hashing logic formed on hashing module 262. In this scenario, register 300 may receive and store initial hash $H_i$ received over input/output port 214 (e.g., partitioned into 32-bit hash portions A-H). A 32-bit input message word $W_t$ may be generated by message scheduling circuitry based on 512-bit input message W. Adder circuitry 304 (e.g., addition modulo 32 circuitry) may receive word $W_t$ from the message scheduling circuitry as well as a SHA-256 constant value $K_t$. Constant value $K_t$ may be specified by the SHA-256 hashing protocol and may correspond to the particular round number of SHA-256 implemented between registers 300 and 302 (e.g., $K_t$ may have a first value for the first round of SHA-256, a second value for the second round of SHA-256, a third value for the $64^{th}$ round of SHA-256, etc.).

Input word $W_t$ may be provided to hash scheduling circuitry 298 by corresponding message scheduling logic on core 220. The message scheduling logic may receive message input W from communications module 260 (FIG. 11) and may perform operations on message W according to the SHA-256 protocol to generate message input words $W_t$. For example, the message scheduling logic may perform logical operations on input message W and may output a single 32-bit word $W_t$ of the input message W after performing the logical operations at any given time. A corresponding message input word $W_t$ may be provided to adder 304 for each round of SHA-256 in hashing module 262 (e.g., a first word $W_0$ may be provided during the first round of SHA-256, a second word $W_1$ may be provided during the second round of SHA-256, etc.). Word $W_t$ may be the most significant word of the message stored in the message scheduling logic at a given time.

The 32-bit hash values stored on registers 300, the corresponding message input word $W_t$, and the corresponding round constant value $K_t$ may be passed to and processed by logic 306 as shown and defined in FIG. 12. The processed 32-bit hash values may be stored on output registers 302. The logical functions performed by logic blocks Ch, $\Sigma1$, Ma, and $\Sigma0$ in logic 306 are defined as shown in FIG. 12. The arrangement of logic circuitry 306 of FIG. 12 is determined by the SHA-256 protocol and is merely illustrative. In general, any desired logic may be formed in circuitry 306 for operating on input hash values stored in registers 300.

The 32-bit processed hash values stored in output registers 302 may be provided to a subsequent round of logic 306 (e.g., logic circuitry having the same configuration as shown in FIG. 11) and the output of the subsequent round of logic may be provided to an additional bank of register circuits. In this way, each of the 64 rounds of SHA-256 logic on hashing module 262 (or hashing module 266) may include corresponding logic circuitry 306 and register circuitry 300/302. In another suitable arrangement, the output of register 302 may loop back to register 300 for the two or more of the 64 rounds of SHA-256 hashing. After the final round of hashing 298 (e.g., the $64^{th}$ round), the processed hash value stored on registers 302 in the $64^{th}$ round of logic circuitry may be used as hash output $H_0$ of FIG. 11 (e.g., after passing through 64 rounds of logic 306, first hash output $H_0$ may be produced as the hash value stored on the final output register circuitry 302 of first hashing module 262). Hash output $H_0$ may be passed to second hashing module 266 (FIG. 11). Similar logic may be formed on second hashing module 266 to generate final hash output $H_F$ using the constant factors as the initial hash value stored on input registers 300 of second hashing module 266 and using a words from the message input corresponding to first hash output $H_0$.

Figure 13:
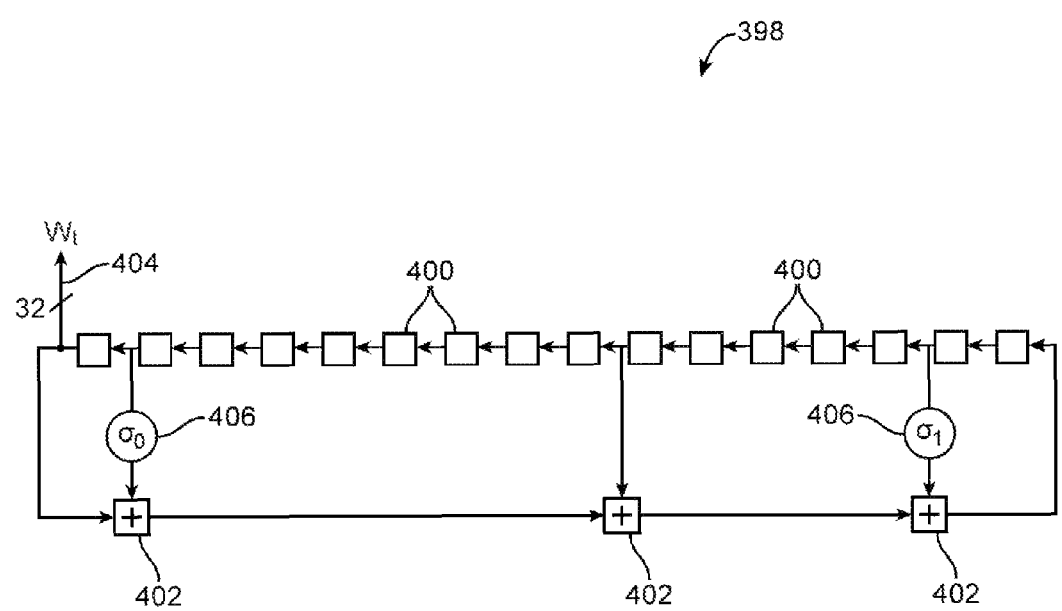
FIG. 13 is an illustrative diagram of message scheduling circuitry that is used to generate message words based on a received message and to provide the message words to rounds of hashing logic of the type shown in FIG. 12 for generating a hash output in accordance with an embodiment.

FIG. 13 is an illustrative diagram of message scheduling logic 398 formed on the first and/or second hashing modules of FIG. 11 for generating input words $W_t$ provided to hash schedule logic 298 based on received message W. An initial message such as 512-bit message input W of FIG. 11 may be stored in registers 400. Each register 400 may store a corresponding 32-bit portion (word) of message W. The stored message W may be shifted through registers 400 word-by-word for each round of SHA-256 performed by hash scheduling circuitry 298. The most significant 32-bit word $W_t$ after each shift through registers 400 may be provided as input word $W_t$ to the corresponding round of hash scheduling logic 298. In this way, each 32-bit input word $W_t$ is based on the message input W received from controller 216.

For example, during the first round of SHA-256 hash schedule 298 as shown in FIG. 12, a first most significant 32-bit word $W_t$ may be provided to adder 304 over path 404, and each word stored on registers 400 may be shifted over to the next register 400 (e.g., in a direction to the left as shown in FIG. 13). The most significant 32-bit word $W_t$ after shifting the words may be provided to adder 304 over path 404 and the words may be shifted again to the next register 400. This process may continue so that a different message input word $W_t$ is provided to each of the 64 rounds of SHA-256 hash scheduling logic 298. Some of the words stored on registers 400 may be passed to logic 406 and adder circuits 402 (addition modulo two adder circuits 402) and a corresponding word may be provided to the last (least significant) register 400 in message scheduling logic 398.

In the example where message scheduling circuitry 398 is formed in first hashing module 262, the 512-bit message initially stored on registers 400 may be input message W received from controller 216. In the example where message scheduling circuitry 398 is formed on second hashing module 266, the 512-bit message initially stored on registers 400 may be first hash output $H_0$ (e.g., after padding to 512 bits using padding circuitry 268) generated by first hashing module 262. The arrangement of logic 406, registers 400, and adders 402 may be determined by the SHA-256 hashing protocol. This example is merely illustrative and, if desired, any arrangement of registers 400, logic 406, and adders 402 may be used for generating message words $W_t$.

As described above in connection with FIG. 11, difficulty comparison circuitry 270 may be configured to check whether the second hash output (i.e., the hash value output from the second hashing module 266) satisfies predetermined difficulty criteria. If the hash output satisfies the predetermined difficulty criteria, a found signal may be issued on line 224 indicating that a potential solution has been found for the given initial hash $H_i$ and message input W. If the hash output fails to satisfy the predetermined difficulty criteria (i.e., if no solution is found), the search space may be updated until a solution is found, until the search space is changed, or until a new block 150 in block chain 200 (FIG. 9) is received.

Figure 14:
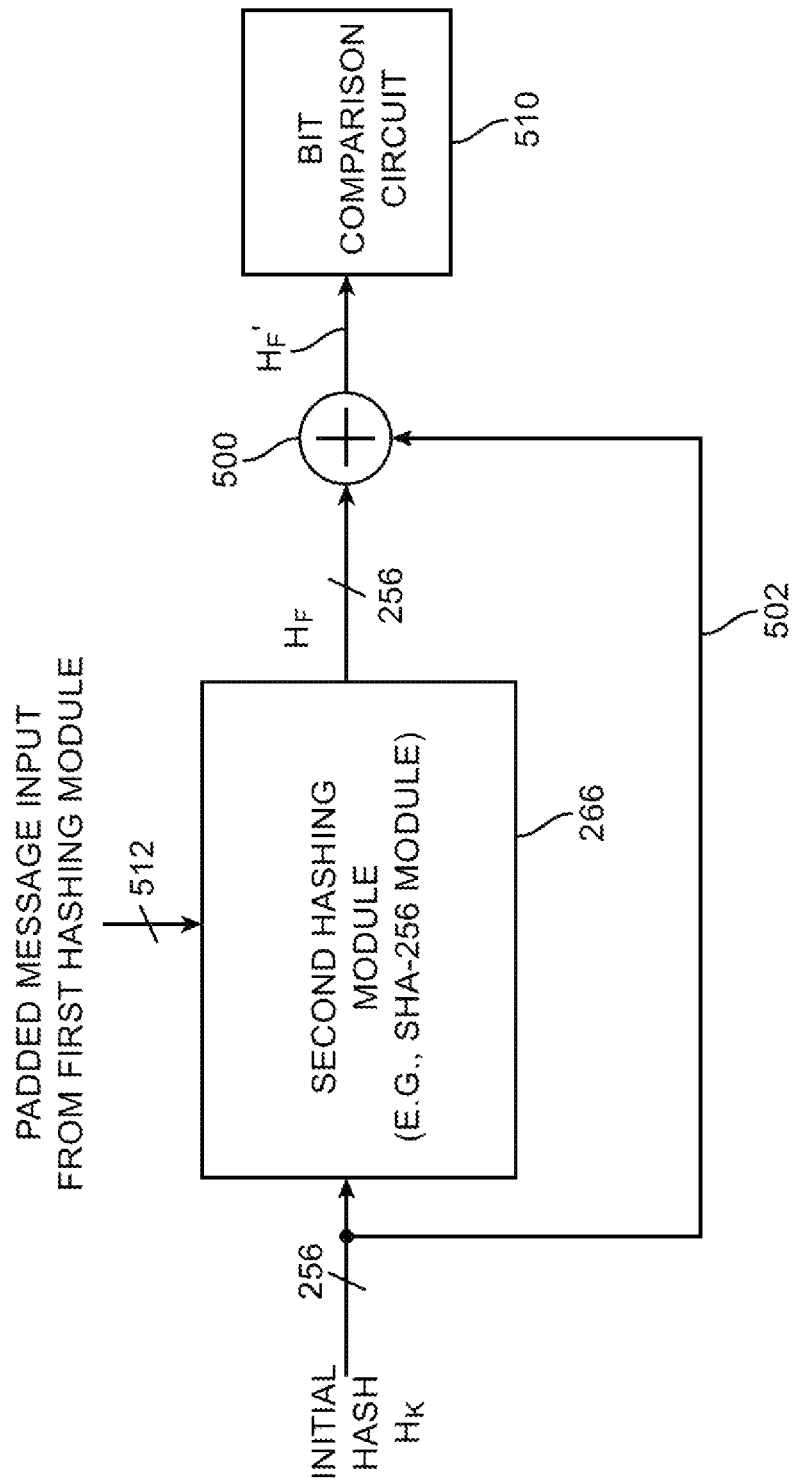
FIG. 14 is a diagram showing how an adder circuit can be appended at the output of hash scheduling circuitry in accordance with an embodiment.

One way of implementing the difficulty criteria checking is shown in FIG. 14. As shown in FIG. 14, the second hashing module 266 may be coupled to an adder circuit 500 and a bit comparison circuit 510. As described previously, second hashing module 266 may receive a padded message input from the first hashing module (i.e., hashing module 262 in FIG. 11) and initial hash $H_k$, and may output hash value $H_F$. Adder 500 may have a first input that receives hash output $H_F$, a second input that receives the constant factors $H_k$, and an output on which a corresponding combined hash output $H_F'$ is generated. The combined hash output $H_F'$ can therefore be computed according to the following equation:

$$H_F' = H_F + H_k \qquad (1)$$

The combined hash output $H_F'$ (sometimes referred to as the Merkle-Damgard sum) may be provided to bit comparison circuit 510 to perform bit-wise checking. Bit comparison circuit 510 and adder 510 may collectively be considered to be part of the difficulty comparison circuitry.

In one arrangement, bit comparison circuit 510 may be configured to directly compare hash output $H_F'$ to a 256-bit difficulty value that is specified by the digital currency protocol. In particular, comparison circuit 510 may be configured to perform a 256-bit comparison operation (i.e., by performing a bitwise comparison between hash output $H_F'$ and the difficulty value to determine whether $H_F'$ is less than the predetermined difficulty value). Implementing the difficulty comparison circuitry in this way to perform a 256-bit comparison, however, requires a substantial amount of hardware resources that consume a large amount of power and is therefore fairly costly.

In another arrangement, bit comparison circuit 510 may be configured to check only a portion of hash output $H_F'$. Instead of checking every single bit (which can be hardware intensive as described above), bit comparison circuit 510 may only have to check a subset of bits in hash output $H_F'$. For example, bit comparison circuit 510 may be configured to check whether the least significant 32 bits of hash output $H_F'$ is equal to a 32 bits of zero (i.e., to determine whether $H_F'[31:0]$ is equal to 32'b0). The notation 32'b0 represents a 32-bit string of zeroes. While this partial comparison scheme is less complex than the 256-bit comparison scheme, the use of adder circuit 500 (which includes eight modulo 32-bit adders) still takes up valuable die area and consumes a substantial amount of power.

Figure 15:
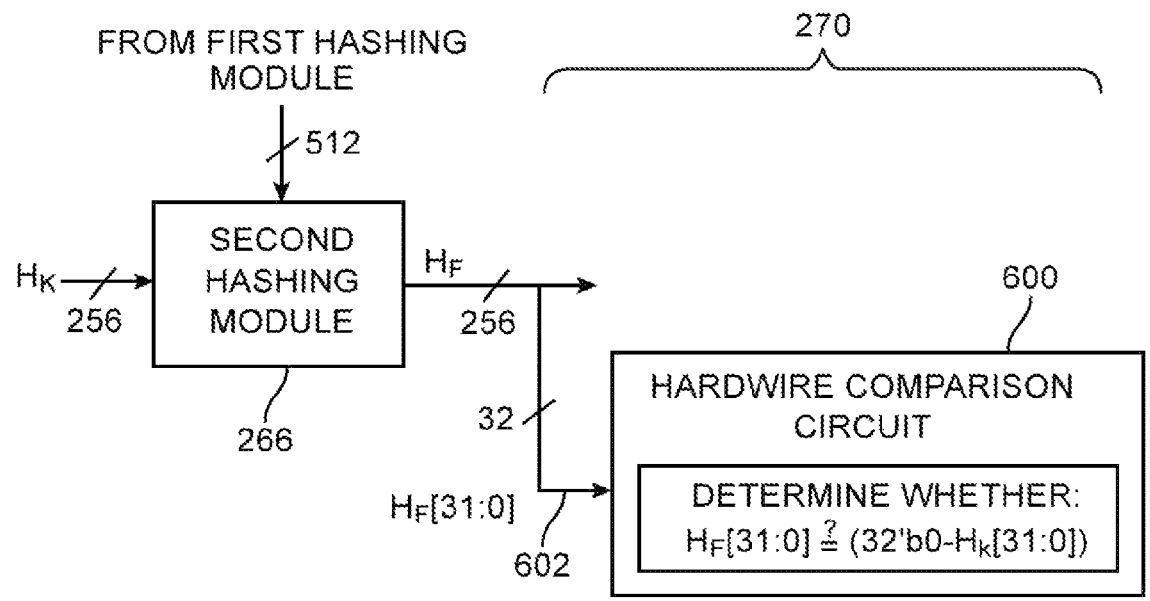
FIG. 15 is a diagram of an illustrative hardwired comparison circuit that may be attached to the output of hash scheduling circuitry in accordance with an embodiment.

In accordance with an embodiment of the present invention, difficulty comparison circuitry 270 may be implemented using a hardwired comparison circuit 600 that obviates the use of adder circuit 500 (see, e.g., FIG. 15). As shown in FIG. 15, hardwired comparison circuit 600 may be configured to receive a portion of hash output $H_F$ directly from the second hashing module 266 via path 602 without any intervening adder circuit.

In particular, a 32-bit portion $H_F[31:0]$ may be routed to comparison circuit 600. Unlike the embodiment of FIG. 14 where the post-addition value $H_F'[31:0]$ can be compared with 32'b0, hardwired comparison circuit 600 may instead be configured to compare $H_F[31:0]$ (which represents the pre-addition hash value) to the difference between 32'b0 and constant factor portion $H_k[31:0]$. Using equation 1 to solve for the pre-addition hash value yields:

$$H_F = H_F' - H_k \qquad (2)$$

Thus, if the goal of the comparison operation to is check whether $H_F'$ includes (n+1) zeros, the comparison operation can be indirectly performed by comparing the pre-addition hash value $H_F[n-1:0]$ to the difference between n'b0 and $H_k[n-1:0]$. In the particular example of FIG. 15 showing a 32-bit comparison, hardwired comparison circuit 600 may be configured to determine whether the received hash portion $H_F[31:0]$ is equal to (32'b0–$H_k[31:0]$). Since $H_k[31:0]$ are predetermined constant factors, the difference (32'b0–$H_k[31:0]$) can therefore also be precomputed if $H_k$ is known. This is merely illustrative and does not serve to limit the scope of the present invention. In general, comparison circuit 600 may be adapted to perform bit checking on any portion of the pre-addition hash output $H_F$ (e.g., on a 16-bit portion of $H_F$, on a 33-bit portion of $H_F$, on a 34-bit portion of $H_F$, on a 36-bit portion of $H_F$, on a 40-bit portion of $H_F$, on a 64-bit portion of $H_F$, on a 128-bit portion of $H_F$, etc.).

Figure 16:
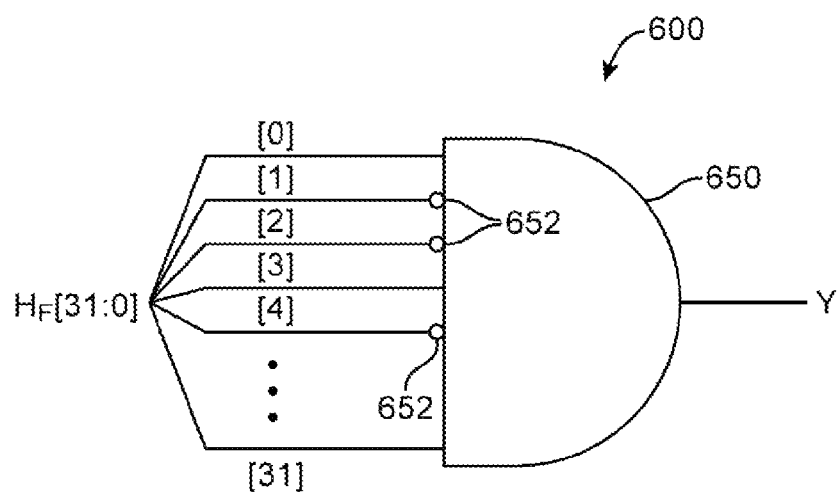
FIG. 16 is a diagram of an illustrative logic gate that may be used to perform a hardwired comparison operation on a 32-bit portion of the hash output in accordance with an embodiment.

FIG. 16 is a diagram of an illustrative logic gate implementation of the hardwired comparison circuit 600 of FIG. 15. As shown in FIG. 16, comparison circuit 600 may include a logic AND gate 650 having 32 inputs and an output (as an example). Logic AND gate 650 may have a first input that receives bit $H_F[0]$, a second input that receives bit $H_F[1]$, a third input that receives bit $H_F[2]$, a fourth input that receives bit $H_F[3]$, a fifth input that receives bit $H_F[4]$, . . . , and a $32^{nd}$ input that receives bit $H_F[31]$. In particular, some of the inputs of logic gate 650 may be inverting inputs for implementing the desired bit comparison.

For example, consider a scenario in which the difference (32'b0–$H_k[31:0]$) is precomputed and the corresponding five least significant bits are equal to 01001. To efficiently perform this comparison, logic AND gate 650 may configure its fifth input, third input, and second input as inverting inputs 652 (as illustrated in FIG. 16). As another example, consider a different scenario in which the difference (32'b0–$H_k[31:0]$) is precomputed and the corresponding five least significant bits are equal to 11101. To efficiently perform this comparison, logic AND gate 650 may configure at least its second input as an inverting input.

Logic gate 650 may assert output Y when a match is identified (e.g., in response to determining that $H_F[31:0]$ is indeed equal to (32'b0–$H_k[31:0]$)) and may otherwise deassert output Y (e.g., in response to determining that $H_F[31:0]$ is not equal to (32'b0–$H_k[31:0]$). The example of FIG. 16 in which hardwired comparison circuit 600 is implemented using a logic AND gate is merely illustrative and does not serve to limit the scope of the present invention. If desired, hardwired comparison circuit 600 may be implemented using logic OR gates, logic NAND gates, logic NOR gates, logic XOR gates, logic XNOR gates, logic inverters, a combination of different types of logic gates, or other suitable types of logic gates with at least some inverting inputs.

While only checking 32 bits of hash output $H_F$ in this way may be efficient, solutions found using this approach may not necessarily pass the full check when the hash output is compared with the 256-bit predetermined difficulty value. Solutions discovered as a result of a match using the hardwired comparison circuit 600 are therefore sometimes referred to as "candidate" solutions. Some of the candidate solutions are actually valid, whereas others may be invalid when fully checked against the predetermined difficulty value. In general, it may be desirable to control the amount of invalid candidate solutions (i.e., false positive solutions) that is provided using this approach.

The number of bits that has to be checked (sometimes referred to herein as the "target" number of bits for comparison) may be dependent on the predetermined difficulty value. Over time, as the predetermined difficulty value increases its found threshold, the target number of bits that has to be checked may rise accordingly.

Figures 17, 18:
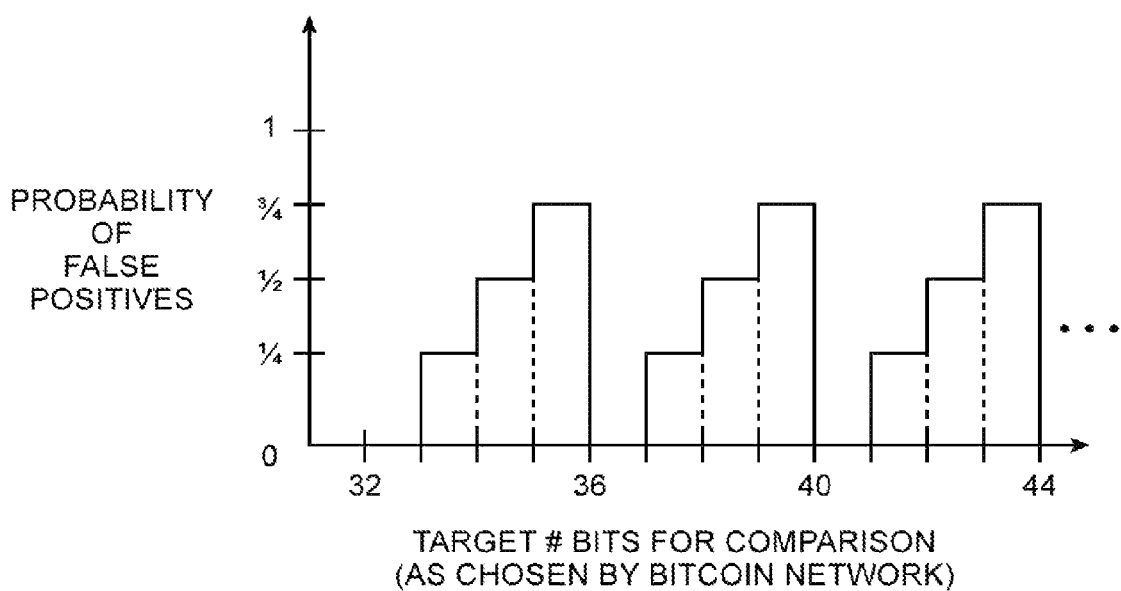
FIG. 17 is table showing how a hardwired comparison circuit may be configured to perform checking on a 64-bit portion of the hash output, where the checked portion is organized into one 32-bit group and eight 4-bit groups in accordance with an embodiment.
FIG. 18 is a graph plotting the probability of false positive candidate solutions versus target number of bits for comparison for a hardwired comparison circuit that is adapted to perform checking on 4-bit group increments in accordance with an embodiment.

In accordance with another embodiment, the difficulty comparison circuitry may be adapted to provide bit checking for a configurable number of bits (e.g., the hardwired comparison circuit of the type described above in connection with FIGS. 15 and 16 may be provided with the capability to adjust the number of bits that is checked). FIG. 17 is table showing how a hardwired comparison circuit may be configured to perform configurable checking on a 64-bit portion of the hash output, where the checked portion is organized into one 32-bit group and eight 4-bit groups in accordance with an embodiment.

As shown in FIG. 17, bits $H_F[31:0]$ may correspond to a base group (j=0); bits $H_F[35:32]$ may correspond to a first incremental group (j=1); bits $H_F[39:36]$ may correspond to a second incremental group (j=2); bits $H_F[43:40]$ may correspond to a third incremental group (j=3); . . . ; and bits $H_F[63:60]$ may correspond to an eighth incremental group (j=8). In general, bits in the base group may always be checked regardless of the target (assuming the target is at least equal to 32).

Each of the incremental groups may selectively be activated as the target number of bits for comparison rises (i.e., as the Bitcoin protocol tightens the predetermined difficulty value). For example, bits in the first incremental group (j=1) may be checked only when the target number of bits for comparison is equal to or greater than 36. Similarly, bits in the second incremental group (j=2) may be checked only when the target number of bits for comparison is equal to or greater than 40. When a particular group is activated, any "preceding" group (i.e., any group with a lower group number j) may automatically be activated to perform bit checking.

FIG. 18 is a graph plotting the probability of false positive candidate solutions versus target number of bits for comparison for a hardwired comparison circuit that is adapted to perform checking on 4-bit group increments in accordance with an embodiment.

As shown in FIG. 18, when the target is equal to 32, the probability of false positives may be equal to zero since the hardwired comparison circuit may be configured to perform checking on all 32 bits in the base group. When the target rises to 33, the probability of false positives may increase to 25% (as an example) since one bit in the first incremental 4-bit group is not actually checked (e.g., checking for the first incremental group may not yet be activated when the target number is less than 36). When the target rises to 34, the probability of false positives may increase to 50% since two bits in the first 4-bit group are not actually checked. When the target rises to 35, the probability of false positives may increase to 75% since three out of four bits in the first group are not actually being checked. However, when the target rises to 36, the probability of false positives falls back down to zero as the first incremental group is switched into use so that bits $H_F[35:32]$ are checked using the first incremental group.

The probability of false positives may vary in the same way for each of the incremental groups as the target number of bits for comparison increases beyond 36 (see, FIG. 18). The example of FIGS. 17 and 18 where the 64-bit checked portion is divided into one 32-bit base group and eight 4-bit incremental groups is merely illustrative. In general, any portion of hash output $H_F$ may be checked and the checked portion may be divided into one or more base groups and multiple incremental groups each of which can include any desired number of bits (e.g., each incremental group may include one bit, two bits, five or more bits, eight or more bits, 16 or more bits, etc.). The granularity of each incremental group (i.e., the number of bits in each incremental group) may be chosen to provide a proper balance between hardware complexity and system efficiency.

Figure 19:
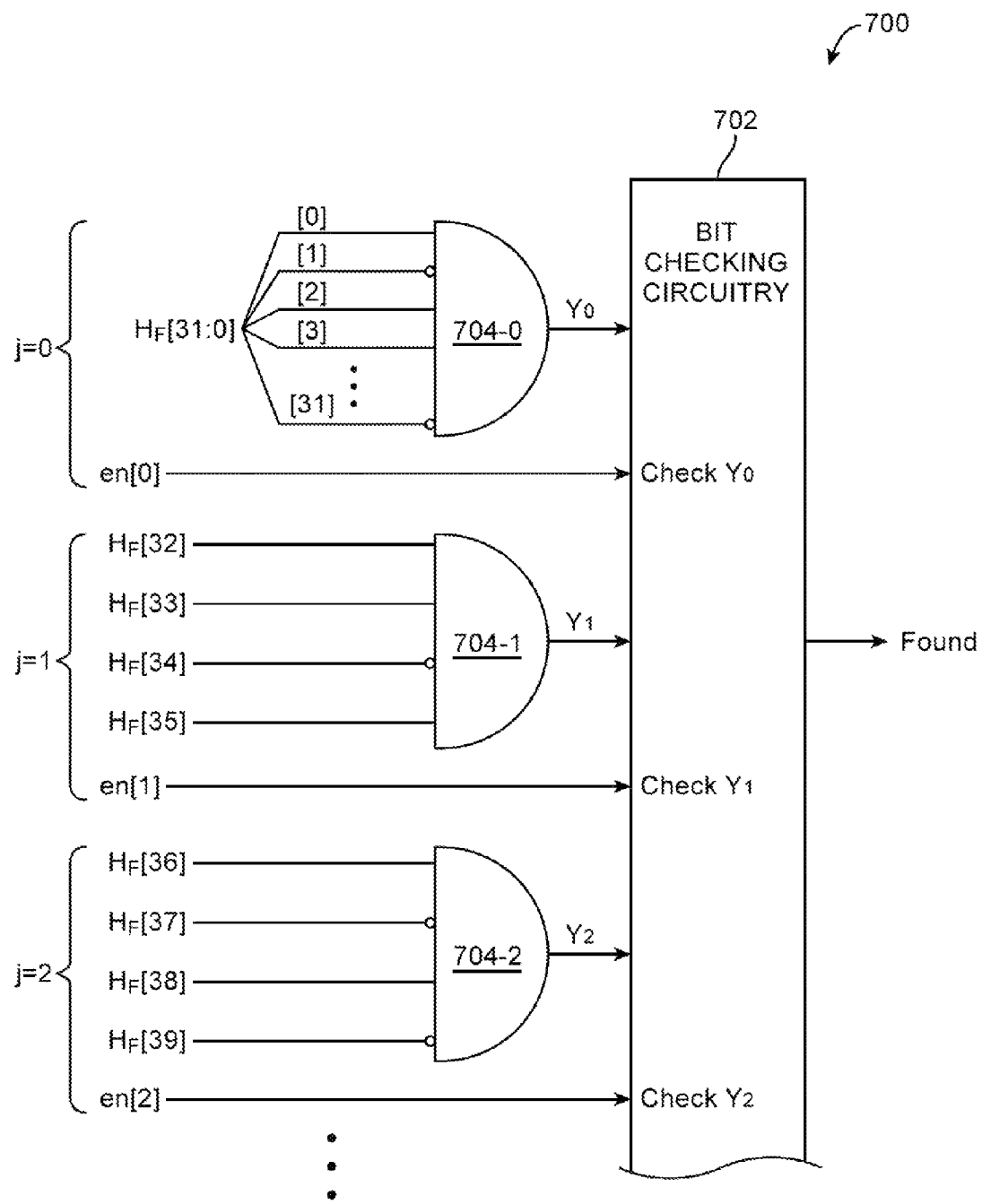
FIG. 19 is a diagram showing one suitable hardware implementation of the hardwired comparison circuit of the type shown in FIG. 17 in accordance with an embodiment.

FIG. 19 is a diagram showing one suitable hardware implementation of a hardwired comparison circuit of the type described in connection with in FIG. 17 in accordance with an embodiment. As shown in FIG. 19, hardwired comparison circuitry 700 may include a first logic gate 704-0 for receiving bits in the base group (j=0), a second logic gate 704-1 for receiving bits in the first incremental group (j=1), a third logic gate 704-2 for receiving bits in the second incremental group (j=2), other incremental groups (not shown for the sake of clarify), and bit checking circuitry 702 that receives output signals from the different logic gates 704 (e.g., logic gates 704-0, 704-1, 704-2, etc.).

In particular, logic gate 704-0 may have inputs (at least some of which are inverting inputs for performing the desired hardwired comparison as described in connection with FIG. 16) for receiving hash output bits $H_F[31:0]$ and an output on which signal Y0 is provided. Signal Y0 may be asserted if $H_F[31:0]$ matches with (32'b0–$H_k[31:0]$) or may otherwise be deasserted. Logic gate 704-1 may have inputs (at least some of which are inverting inputs for performing the desired hardwired comparison for bits in the first incremental group) for receiving hash output bits $H_F[35:32]$ and an output on which signal Y1 is provided. Signal Y1 may be asserted if $H_F[35:32]$ matches with (32'b0–$H_k[35:32]$) or may otherwise be deasserted. Logic gate 704-2 may have inputs (at least some of which are inverting inputs for performing the desired hardwired comparison for bits in the second incremental group) for receiving hash output bits $H_F[39:36]$ and an output on which signal Y2 is provided. Signal Y2 may be asserted if $H_F[39:36]$ matches with (32'b0–$H_k[39:36]$) or may otherwise be deasserted. Bit checking circuitry 702 may issue a found signal when all of the output signals Y are asserted (i.e., when Y0, Y1, Y2, and corresponding signals generated at the output of the other logic gates 704 are all asserted).

Bit checking circuitry 702 may have inputs that receive the output bits Y0, Y1, and Y2 from logic gates 704. Bit checking circuitry 702 may also have additional inputs that receive group enable bits en[m:0], where the checked portion of the hash output is organized into one base group and m incremental 4-bit groups. Enable bit en[0] may determine whether the base group is active. If bit en[0] is asserted (e.g., if en[0] is a logic "1"), bit checking circuitry 702 may issue the found signal only if Y0 is asserted. If bit en[0] is deasserted (e.g., if en[0] is a logic "0"), bit checking circuitry 702 may ignore the state of Y0 (e.g., the found signal can possibly be issued even when Y0 is deasserted as long as the other active groups are properly matching or "valid").

Enable bit en[1] may determine whether the first incremental group is active. If bit en[1] is asserted, bit checking circuitry 702 may issue the found signal only if Y1 is asserted (i.e., the assertion of Y1 is a necessary condition for a candidate solution). If bit en[1] is deasserted, bit checking circuitry 702 may ignore the state of Y1 (i.e., the assertion of Y1 is not a necessary condition for a candidate solution). Enable bit en[2] may determine whether the second incremental group is active. If bit en[2] is asserted (i.e., when the second incremental group is switched into use), bit checking circuitry 702 may issue the found signal only if Y2 is asserted. If bit en[2] is deasserted (i.e., to indicate that the second incremental group is switched out of use), bit checking circuitry 702 may ignore the state of Y2. Circuitry 702 operated in this way may therefore sometimes be referred to as control circuitry for hardwired comparison circuit 700.

The control of the enable bits may be dependent on the target number of bits for comparison. Enable bit en[0] may always be asserted to ensure that the base group is always checked. Enable bit en[1] may be asserted when the target is greater than or equal to 36 (in this example) to switch the first incremental group into use. Enable bit en[2] may be asserted when the target is greater than or equal to 40 to switch the second incremental group into use. The assertion of the enable bits may be controlled using comparison control circuitry that may be part of the difficulty compare circuitry (e.g., circuitry 270 of FIG. 11).

The example of FIG. 19 in which hardwired comparison circuit 700 is implemented using logic AND gates with some inverting inputs is merely illustrative and does not serve to limit the scope of the present invention. If desired, hardwired comparison circuit 700 may be implemented using logic OR gates, logic NAND gates, logic NOR gates, logic XOR gates, logic XNOR gates, logic inverters, a combination of different types of logic gates, or other suitable types of logic gates with at least some inverting inputs. The enable bits may be selectively asserted as the number of target bits for comparison increases (e.g., circuit 700 may be adapted to provide the desired bit checking granularity depending on the target number of bits to be checked as set by the Bitcoin protocol).

Figure 20:
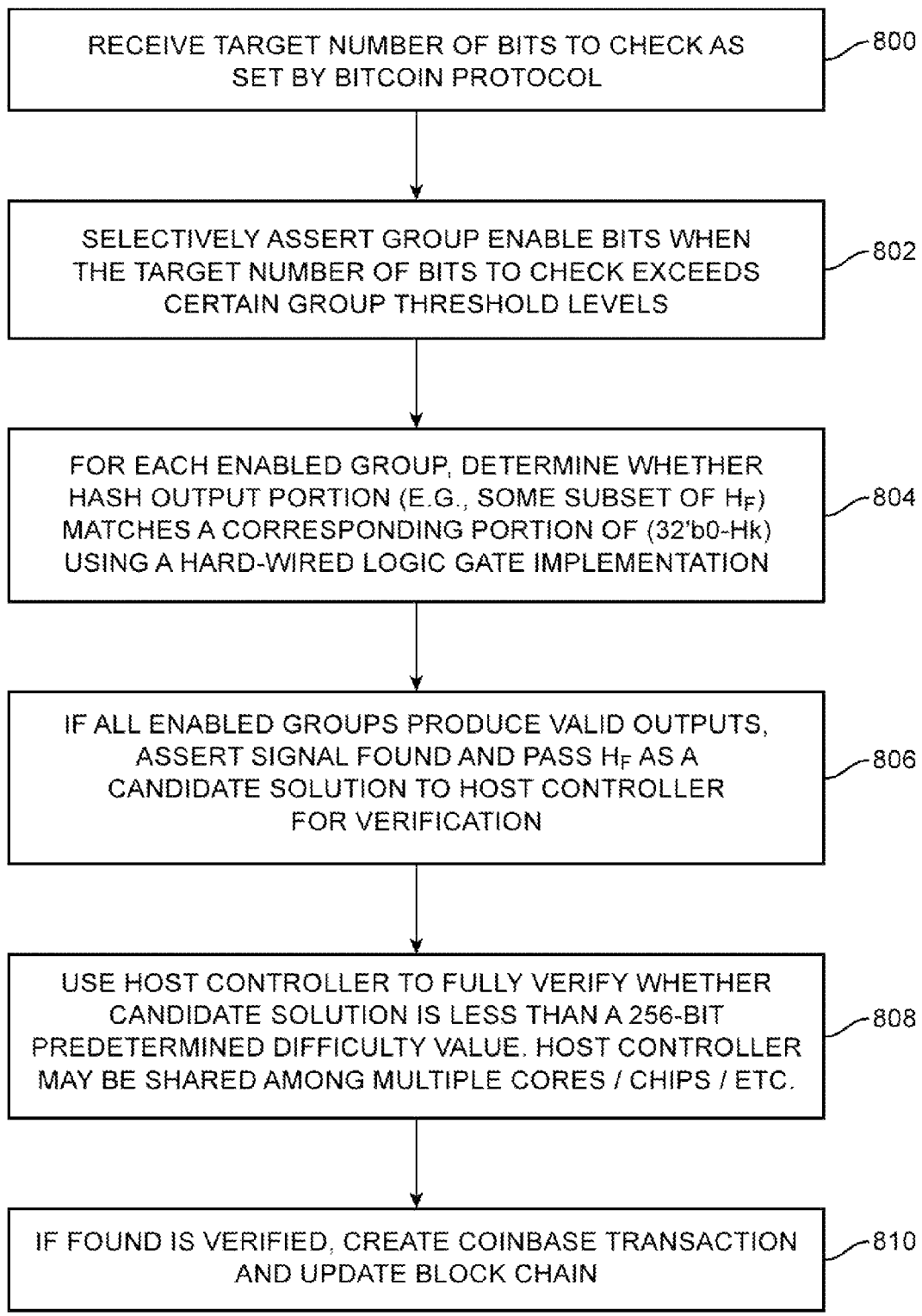
FIG. 20 is a flow chart of illustrative steps for operating digital currency mining circuitry to perform a two-tiered solution checking operation in accordance with an embodiment.

FIG. 20 is a flow chart of illustrative steps for operating digital currency mining circuitry that includes a hardwired comparison circuit of the type described in connection with FIGS. 15-19 to perform a two-tiered solution checking operation in accordance with an embodiment.

At step 800, the digital currency mining circuitry may receive or identify a target number of bits that needs to be checked according to the Bitcoin protocol (e.g., a number that specifies how many bits in the final hash output $H_F$ has to be checked or compared against a predetermined value).

At step 802, control circuitry may be used to selectively assert one or more of the group enable bits en[m:0] depending on the target number of bits that need to be checked. The enable bit en[0] for a base group (e.g., a group that checks the 32 least significant bits) may generally be asserted regardless of the target number. When the target number exceeds a first group threshold level (e.g., when the target number is greater than 35), enable bit en[1] may be asserted to switch into use a first incremental group to check any extra bits that are not being checked by the base group. Similarly, when the target number exceeds a second group threshold level (e.g., when the target number is greater than 39), enable bit en[2] may be asserted to activate a second incremental group to check any extra bits that are not being checked by the base group and the first incremental group. Other incremental groups may be selectively enabled in this way depending on the target number.

At step 804, one or more logic gates in the hardwired comparison circuit (see, e.g., logic comparison gates 704 of the type shown in FIG. 19) may be used to determine whether a hash output portion (i.e., some subset of bits in hash output $H_F$) for each enabled group matches a corresponding portion of bits in the predetermined difference $(32'b0-H_k)$. Each of the logic gates may generate a valid output signal when the checked bits are matching or an invalid output signal when the checked bits are mismatched.

At step 806, bit checking circuitry 702 (e.g., circuitry 702 in FIG. 19) may receive the output signals from each of the logic comparison gates and may issue a found signal when all of the output signals for each of the enabled groups are valid. In such scenarios, the mining circuitry may pass the current hash output (or some other version of the current hash output) as a candidate solution to a host controller for full verification. The host controller may be part of control circuitry 216 of FIG. 10, part of off-chip processing circuitry 215, or may exist in another node in the peer-to-peer network 100 of FIG. 1.

At step 808, the host controller may then check in software whether the candidate solution is indeed less than a 256-bit predetermined difficulty value (with a 0% false positive probability). In other words, the bit comparison circuitry may check a subset of bits in the hash output to identify a candidate solution with partial certainty (i.e., with some chance of a false positive), whereas the host controller may compare the hash output against the predetermined difficulty criteria to verify the validity of the candidate solution with full certainty.

In general, the host controller may be shared among multiple cores, chips, or nodes such that the host controller can be used to check the candidate solutions that are generated from the different search spaces. Performing a two-tiered verification operation in this way (e.g., using the adaptive hardwired comparison in a core to efficiently find candidate solution and then using a shared host controller to double check the candidate solution with full certainty) can help optimize the performance and efficiency of the digital currency mining operation at a system level.

If the found candidate solution is verified by the host controller, a coinbase transaction (e.g., coinbase transaction 140 described in connection with FIG. 5) may be created and a block header (e.g., block header 152 described in connection with FIG. 6) may be updated (at step 810). During this step, other operations that is typically executed when a new Bitcoin has been mined may also be performed.

The steps of FIG. 20 are merely illustrative and do not limit the scope of the present invention. Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating digital currency mining circuitry, comprising:
   using cryptographic hashing circuitry to generate a hash output;
   using bit comparison circuitry to check a subset of bits in the hash output to identify a candidate solution, wherein checking the subset of bits in the hash output comprises comparing only a portion of the hash output to a result of a string of zeros subtracted by predetermined constant factors; and in response to identifying the candidate solution, using a host controller to verify the candidate solution by determining whether the hash output satisfies predetermined difficulty criteria.

2. The method of claim 1, wherein using the bit comparison circuitry to check the subset of bits in the hash output identifies the candidate solution with partial certainty, and wherein using the host controller to compare the hash output against the predetermined difficulty criteria verifies a validity of the candidate solution with full certainty.

3. The method of claim 1, wherein using the bit comparison circuitry to check the subset of bits in the hash output to identify the candidate solution comprises:
using a logic gate to assert an output signal when the subset of bits in the hash output matches with a predetermined value and to deassert the output signal when the subset of bits in the hash output differs from the predetermined value.

4. The method of claim 1, further comprising:
using a plurality of cryptographic hashing circuitries to perform hashing on different search spaces in parallel; and
using the host controller to receive candidate solutions from the plurality of cryptographic hashing circuitries.

5. The method of claim 1, wherein using the cryptographic hashing circuitry to generate the hash output comprises:
using a first hashing module to generate a first hash output; and
using a second hashing module to generate the hash output based on the first hash output.

6. The method of claim 5, further comprising:
with the first hashing module, receiving a message input and receiving an initial hash input.

7. The method of claim 5, further comprising: padding the first hash output.

8. The method of claim 5, wherein comparing only the portion of the hash output to the result of a string of zeros subtracted by predetermined constant factors comprises: using a logic gate to perform the checking.

9. The method of claim 8, wherein the logic gate comprises a logic AND gate.

* * * * *